United States Patent
Chavva et al.

(10) Patent No.: US 11,212,065 B2
(45) Date of Patent: *Dec. 28, 2021

(54) METHOD AND DEVICE FOR MANAGING SYSTEM INFORMATION BLOCK, PHYSICAL BROADCAST CHANNEL IN WIRELESS COMMUNICATION NETWORK

(71) Applicant: Samsung Electronics Co., Ltd., Suwon-si (KR)

(72) Inventors: Ashok Kumar Reddy Chavva, Bangalore (IN); Anshuman Nigam, Bangalore (IN); G Venkata Ramana, Bangalore (IN); Nitin Saini, Bangalore (IN); Sripada Kadambar, Bangalore (IN); Kushagra, Bangalore (IN); Anusha Gunturu, Bangalore (IN); Shubham Khunteta, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/432,353

(22) Filed: Jun. 5, 2019

(65) Prior Publication Data

US 2019/0288824 A1    Sep. 19, 2019

Related U.S. Application Data

(63) Continuation of application No. 15/012,350, filed on Feb. 1, 2016, now Pat. No. 10,341,078.

(30) Foreign Application Priority Data

Jan. 30, 2015  (IN) .......................... 464/CHE/2015
Jan. 27, 2016  (IN) .......................... 464/CHE/ 2015

(51) Int. Cl.
 *H04L 5/14* (2006.01)
 *H04W 4/70* (2018.01)
 (Continued)

(52) U.S. Cl.
 CPC .............. *H04L 5/14* (2013.01); *H04L 5/0028* (2013.01); *H04L 5/0048* (2013.01);
 (Continued)

(58) Field of Classification Search
 CPC ....... H04L 5/14; H04L 5/0028; H04L 5/0048; H04L 5/0091; H04L 5/0023; H04L 5/0035; H04W 48/16; H04W 4/70; H04W 74/08
 See application file for complete search history.

(56) References Cited

U.S. PATENT DOCUMENTS 8,724,563 B2    5/2014 Yoo et al.
2012/0327895 A1  12/2012 Wallen et al.
(Continued)

FOREIGN PATENT DOCUMENTS

WO    2014/110804 A1    7/2014
WO    2014/121461 A1    8/2014
(Continued)

OTHER PUBLICATIONS

Sharp, "Discussion on PRACH Coverage Enhancement for MTC UE", 3GPP TSG RAN WG1 Meeting #75, R1-135342, Nov. 2, 2013.

(Continued)

*Primary Examiner* — Thai Nguyen
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet (Continued)

of Things (IoT). The present disclosure may be applied to intelligent services based on the 5G communication technology and the IoT-related technology, such as smart home, smart building, smart city, smart car, connected car, health care, digital education, smart retail, security and safety services.

A method for managing a system information block (SIB) in a wireless communication network.

10 Claims, 20 Drawing Sheets

(51) Int. Cl.
  *H04W 48/16* (2009.01)
  *H04L 5/00* (2006.01)
  *H04W 74/08* (2009.01)

(52) U.S. Cl.
  CPC ............ *H04L 5/0091* (2013.01); *H04W 4/70* (2018.02); *H04W 48/16* (2013.01); *H04L 5/0023* (2013.01); *H04L 5/0035* (2013.01); *H04W 74/08* (2013.01)

(56) References Cited

U.S. PATENT DOCUMENTS

| | | |
|---|---|---|
| 2013/0136098 A1 | 5/2013 | Li et al. |
| 2013/0170479 A1 | 7/2013 | Fong et al. |
| 2013/0182680 A1 | 7/2013 | Choi et al. |
| 2013/0250878 A1 | 9/2013 | Sayana et al. |
| 2013/0301524 A1 | 11/2013 | Xu et al. |
| 2014/0198726 A1 | 7/2014 | Xu et al. |
| 2014/0341141 A1 | 11/2014 | Nguyen et al. |
| 2015/0189652 A1* | 7/2015 | Mizusawa .......... H04B 7/15542 370/280 |
| 2015/0341957 A1 | 11/2015 | Tang et al. |
| 2016/0043849 A1* | 2/2016 | Lee ..................... H04W 72/042 370/329 |
| 2016/0088595 A1 | 3/2016 | You et al. |
| 2016/0105862 A1* | 4/2016 | Charbit .................. H04L 7/027 370/336 |
| 2016/0269872 A1* | 9/2016 | Kim .................. H04W 72/0446 |

FOREIGN PATENT DOCUMENTS

| | | |
|---|---|---|
| WO | 2014/185659 A1 | 11/2014 |
| WO | 2015/020583 A1 | 2/2015 |

OTHER PUBLICATIONS

WF on PBCH Repetition for Coverage Enhancements of MTC, 3GPP TSG RAN WG1 #79, R1-145400, Nov. 17-21, 2014, Agenda Item 6.3.1.2.3, San Francisco, USA.

Ericsson, Transport block size and SIB transmission in low cost/complexity MTC UEs, 3GPP TSG-RAN WG2 #84, R2-134320, San Francisco, USA, Nov. 13, 2013.

Alcatel-Lucent et al.. Coverage enhancement for common control messages, 3GPP TSG RAN WG1 Meeting #79, R1-144698, San Francisco, USA, Nov. 17, 2014.

Alcatel-Lucent Shanghai Bell et al., SIB transmission for coverage extension MTC UEs, 3GPP TSG-WG RAN2#84, R2-140725, Feb. 9, 2014, Prague, Czech Republic.

ZTE, Considerations on common control messages for MTC enhancement, 3GPP TSG RAN WG1 Meeting #78bis, R1-143809, Oct. 5, 2014, Ljubljana, Slovenia.

European Search Report dated Nov. 26, 2020, issued in European Application No. 20190223.6.

* cited by examiner

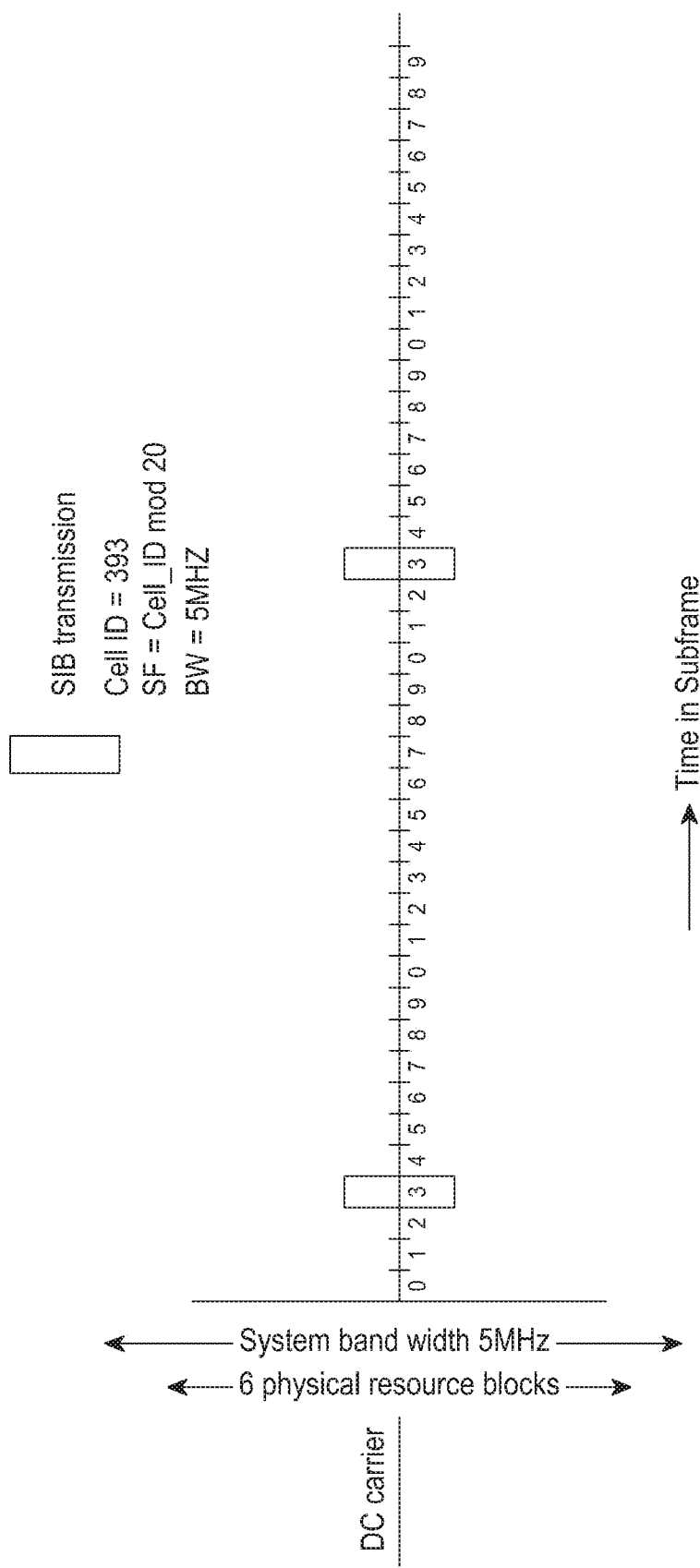

| $X_{14}$ | $Y_{10}$ | $Z_{16}$ |

MTC MIB (40 bits)

| $X_{42}$ | $Y_{30}$ | $Z_{48}$ |

Encoded MTC MIB (120 bits)

| $X_{42}$ | $Y_{30}$ | $Z_{48}$ |

| $X_{42}$ | $Z_{48}$ |  Second subframe

FIG.12B

METHOD AND DEVICE FOR MANAGING SYSTEM INFORMATION BLOCK, PHYSICAL BROADCAST CHANNEL IN WIRELESS COMMUNICATION NETWORK

PRIORITY

This application is a continuation application of prior application Ser. No. 15/012,350, filed on Feb. 1, 2016, and was based on and claimed priority under 35 U.S.C. § 119(a) of an Indian patent application filed on Jan. 30, 2015 in the Indian Patent Office and assigned Serial number 464/CHE/2015, and of an Indian patent application filed on Jan. 27, 2016 in the Indian Patent Office and assigned Serial No. 464/CHE/2015, the entire disclosure of each of which is hereby incorporated by reference.

BACKGROUND OF THE INVENTION

1. Field of the Invention

The present invention relates to a wireless communication network. More particularly relates to method and device for managing a system information block (SIB) in the wireless communication network.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, MTC devices are devices, such as a meter or sensor, which collect and send data to a MTC server or other MTC device over a wireless communication network.

In case of MTC devices, system information (SI) acquisition and physical random access channel (PRACH) transmission plays a very important role in a MTC system and they are required to be changed for MTC. Therefore, there is a need to implement various procedures to control network access by MTC devices and minimize the impact on non-MTC devices.

The above information is presented as background information only to help the reader to understand the present invention. Applicants have made no determination and make no assertion as to whether any of the above might be applicable as Prior Art with regard to the present application.

SUMMARY OF THE INVENTION

The principal object of the embodiments herein is to provide a method and device for managing a system information block (SIB) in a wireless communication network.

Another object of the embodiments herein is to provide a method and device of transmitting a physical random access channel (PRACH) preamble.

Another object of the embodiments herein is to provide a method and device for managing a physical broadcast channel (PBCH) in the wireless communication network.

Accordingly the embodiments herein provide a method of managing a system information block (SIB) in a wireless communication network. The method includes obtaining a primary synchronization signal (PSS) and a secondary synchronization signal (SSS) from a base station. The method includes obtaining a cell identity (ID) and a duplex mode from the PSS and the SSS. Further, the method includes obtaining a time resource and a frequency resource from a function of the cell ID and the duplex mode. Furthermore, the method includes reading a system information block (SIB) based on the time resource and the frequency resource.

Accordingly the embodiments herein provide a method of managing a system information block (SIB) in a wireless communication network. The method includes obtaining system information (SI) from a base station. The method includes transmitting a physical random access channel (PRACH) preamble in a RACH resource to a base station. The method includes waiting for a predetermined time for a random access response (RAR) message from the base station. Further, the method includes determining that a predetermined time to retransmit the PRACH preamble is reached. Furthermore, the method includes repeating transmission of the PRACH preamble to the base station for a maximum number of repetition levels.

Accordingly the embodiments herein provide a method of managing a physical broadcast channel (PBCH) in a wireless communication network. The method includes encoding a master information block (MIB) in a first subframe. Further, the method includes encoding partial bits of the MIB in a second subframe. The partial bits include a first partial bit, and a second partial bit. Furthermore, the method includes transmitting at least one of the first subframe and the second subframe on the PBCH.

Accordingly the embodiments herein provide a machine-type-communication (MTC) device. The MTC device includes a communication interface unit configured to obtain a primary synchronization signal (PSS) and a secondary synchronization signal (SSS) from a base station. The MTC device includes a processing unit configured to obtain a cell identity (ID) and a duplex mode from the PSS and the SSS. Further, the processing unit is configured to obtain a time resource and a frequency resource from a function of the cell ID and the duplex mode. Furthermore, the MTC device is configured to read a system information block (SIB) based on the time resource and the frequency resource.

Accordingly the embodiments herein provide a machine-type-communication (MTC) device. The MTC device includes a communication interface unit configured to obtain system information (SI) from a base station. The communication interface unit is configured to transmit a physical random access channel (PRACH) preamble in a RACH resource to a base station. The MTC device includes a processing unit configured to wait for a predetermined time for a random access response (RAR) message from the base station. Further, the processing unit is configured to determine that a predetermined time to retransmit the PRACH preamble is reached. The communication interface unit is further configured to repeat transmission of the PRACH preamble to the base station for a maximum number of repetition levels.

Accordingly the embodiments herein provide a base station. The base station includes an encoding unit configured to encode a MIB in a first subframe. Further, the encoding unit is configured to encode partial bits of the master information block (MIB) in a second subframe. The partial bits include a first partial bit, and a second partial bit. The base station includes communication interface unit configured to transmit at least one of the first subframe and the second subframe on the PBCH.

Accordingly the embodiments herein provide a machine-type-communication (MTC) device including a communication interface unit configured to receive at least one of the first subframe and the second subframe. The MTC device includes a decoding unit configured to decode the partial bits in the second subframe and the MIB in the first subframe.

Accordingly the embodiments herein provide a base station. The base station includes a processing unit configured to: identify a first PRACH preamble index and a second PRACH preamble index received from one of a first MTC device and a second MTC device; and a communication interface unit configured to: transmit a pair of random access response (RAR) messages to said first MTC device and said second MTC device based on an identification, wherein said RAR message indicates a repetition level associated with said repeated transmission. The base station includes said communication interface unit configured to: transmit, to said first MTC device, a RAR message indicating a repetition level associated with said repeated transmission; and transmit, to said second MTC device, a RAR message indicating a repetition level associated with said repeated transmission.

Accordingly the embodiments herein provide a base station. The base station includes setting a cell identity (ID) and a duplex mode in a primary synchronization signal (PSS) and a secondary synchronization signal (SSS); transmitting, to at least one of a first MTC device and a second MTC, said PSS and said SSS, wherein said cell ID and said duplex mode is used for obtain a time resource and a frequency resource; and wherein a system information block (SIB) is read based on said time resource and said frequency resource.

Accordingly the embodiments herein provide a base station. The base station includes a processing unit configured to: set a cell identity (ID) and a duplex mode in a primary synchronization signal (PSS) and a secondary synchronization signal (SSS); and a communication interface unit configured to: transmit, to at least one of a first MTC device and a second MTC, said PSS and said SSS, wherein said cell ID and said duplex mode is used for obtain a time resource and a frequency resource; and wherein a system information block (SIB) is read based on said time resource and said frequency resource.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 4b is another example illustration in which the MTC device obtains a time resource and frequency resource for reading the SIB, according to the embodiments as disclosed herein;

FIG. 12b illustrates decoding of partial bits in the first subframe by the MTC device, according to the embodiments as disclosed herein;

DETAILED DESCRIPTION OF EXEMPLARY EMBODIMENTS

Figure 1:
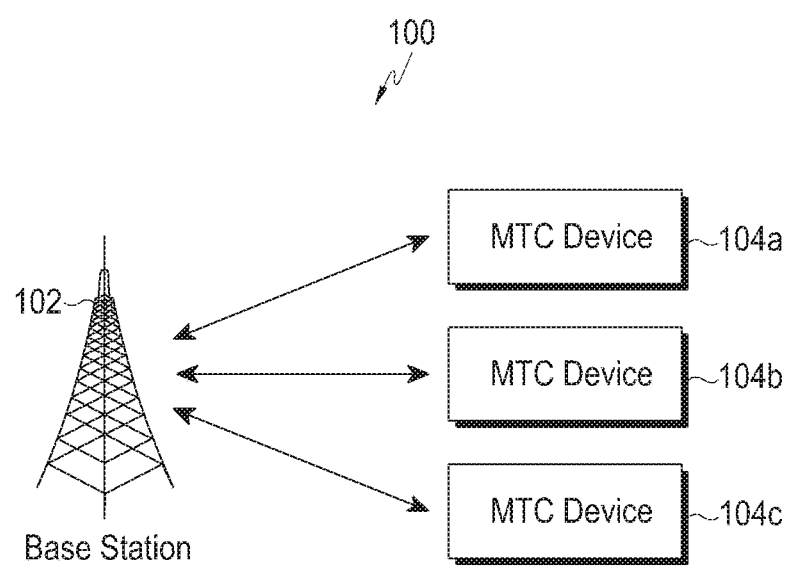
FIG. 1 illustrates an overview of a wireless communication network for managing a system information block (SIB) and a physical broadcast channel (PBCH), according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method of managing a system information block (SIB) in a wireless communication network. The method includes obtaining a primary synchronization signal (PSS) and a secondary synchronization signal (SSS) from a base station. The method includes obtaining a cell identity (ID) and a duplex mode from the PSS and the SSS. Further, the method includes obtaining a time resource and a frequency resource from a function of the cell ID and the duplex mode. Furthermore, the method includes reading a SIB based on the time resource and the frequency resource.

Unlike the conventional methods, the proposed method is used for transmitting SIBs to MTC devices (possibly in SIB1) both for coverage enhanced and non-coverage enhanced modes.

The proposed method provides a mechanism for efficient transmission of SIB to MTC devices by providing:

Decode-ability of MTC_SIB1, with essential MTC relevant system information without MIB dependency.

Choice of Resources for MTC_SIB1 or SIB1 for improved decode-ability.

Resource location pointers for other relevant MTC_SIBs or regular SIBs within MTC_SIB1.

In the existing system, SIB1 decoding is performed after decoding a Master Information Block (MIB). With the proposed method, the MTC devices, can decode the SIB independent of MIB.

The advantages of decoding MTC_SIB1 or SIB1 decoding independent of the MIB include parallel decoding of MIB and SIB1 on same center resource blocks (for example six resource blocks), thereby reducing total acquisition time and the power consumed.

Furthermore, unlike the conventional methods, with the proposed method, the MTC device can obtain information on a cell identity (ID) and MIB contents. When the MIB information includes bandwidth and a system frame number (SFN), the MTC obtains the SIB from the cell ID, the bandwidth information and SFN which is available to the MTC device.

The embodiments herein provide a method of managing a system information block (SIB) in a wireless communication network. The method includes obtaining system information (SI) from a base station. The method includes transmitting a physical random access channel (PRACH) preamble in a RACH resource to a base station. The method includes waiting for a predetermined time for a random access response (RAR) message from the base station. Further, the method includes determining that a predetermined time to retransmit the PRACH preamble is reached. Furthermore, the method includes repeating transmission of the PRACH preamble to the base station for a maximum number of repetition levels.

Unlike the conventional methods, with the proposed method the following advantages in which:

Power consumption reduction by stopping and waiting between multiple levels of repetitions.

A method of embedding the repetition at which the PRACH preamble transmission was success by encoding the information on RA_RNTI at the base station, such that the MTC device determines the repetition level that was successful and stops the transmission of the PRACH preamble. Hence it can be called Adaptive PRACH repetition.

The embodiments herein provide a method of managing a physical broadcast channel (PBCH) in a wireless communication network. The method includes encoding a master information block (MIB) in a first subframe. Further, the method includes encoding partial bits of the MIB in a second subframe. The partial bits include a first partial bit, and a second partial bit. Furthermore, the method includes transmitting at least one of the first subframe and the second subframe on the PBCH.

Unlike the conventional methods, the proposed method provides a mechanism in which the contents of MIB are repeated in the second subframe, where the partial bits of the MIB are encoded and transmitted to the MTC device. As the MTC devices require repetition of contents of MIB for efficient decoding, the proposed method allows the encoding of the partial bits of the MIB in the second subframe (for example in the subframe 5), unlike to the conventional system where the MIB is transmitted in a single subframe (i.e., subframe 0).

Referring now to the drawings and more particularly to FIGS. 1 through 12d where similar reference characters denote corresponding features consistently throughout the figures, there are shown preferred embodiments.

FIG. 1 illustrates an overview of a wireless communication network 100 for managing a physical broadcast channel (PBCH) and a system information block (SIB), according to the embodiments as disclosed herein. As depicted in the FIG. 1, the wireless communication network 100 includes a base station 102, a MTC device 104a, a MTC device 104b and a MTC device 104c. In an example, the base station 102 is a long term evolution (LTE) base station, i.e., evolved node base station (eNodeB). In an example, the MTC device 104a can be a communication device, a user equipment (UE), a metering device, or the like.

The base station 102 communicates with the MTC devices 104a, 104b and 104c in the coverage area of the base station 102. From the FIG. 1, it should be noted that the MTC devices 104a, 104b and 104c are located at different distances with respect to the base station 102. As the MTC devices are at different locations with respect to the base stations, the base station 102 needs to repeat transmissions of the MIB in the PBCH such that each MTC device receives the PBCH and attempts decoding the PBCH for identifying the resources configured for each MTC device (i.e., 104a-104c).

The method of managing SIB in the wireless communication network 100 is as described herein. Initially, the MTC device 104a obtains the PSS and the SSS from the base station 102. The MTC device 104a obtains the cell ID and the duplex mode from the obtained PSS and the SSS. Further, the MTC device 104a obtains the time resource and frequency resource based on the obtained cell ID and the duplex mode. The MTC device 104a reads the SIB based on the obtained time resource and frequency resource. The detailed explanation of reading the SIB based on the time resource and the frequency resource is described with examples in the FIGS. 4a and 4b.

In an embodiment, for obtaining the time resource and the frequency resource, the MTC device 104a computes the cell ID and the duplex mode from the obtained PSS and the SSS. Further, the MTC device 104a receives bandwidth information and a SFN from the base station 102 in the MIB. The MTC device 104a obtains the time resource and frequency resource from the cell ID, the duplex mode, the bandwidth information and the SFN. The detailed explanation of reading the SIB based on the time resource and the frequency resource is explained with an example in the FIG. 4c.

In an embodiment, the MTC device 104a transmits a physical random access channel (PRACH) preamble in a RACH resource to the base station 102. Further, the MTC device 104a determines that a predetermined time to retransmit the PRACH preamble to the base station 102 is reached. If the predetermined time to retransmit the PRACH preamble is reached, then the MTC device 104a repeats transmission of the PRACH preamble to the base station for a maximum number of repetition levels.

In an embodiment, the maximum number of repetition levels is three.

In an embodiment, the MTC device 104a transmits a first physical random access channel (PRACH) preamble in a RACH resource to the base station 102 and the second MTC device 104b transmits a second PRACH preamble in a RACH resource to the base station 102. Further, the first MTC device 104a and the second MTC device 104b determines that the predetermined time to retransmit the PRACH preamble is reached. If the predetermined time to retransmit the PRACH preamble is reached, then the first MTC device 104a and the second device 104b dynamically selects second PRACH preamble index. Further, the first MTC device 104a and the second device 104b transmits the PRACH preambles corresponding to the selected indices to the base station 102 for the maximum number of repetition levels.

When the base station 102 receives the first PRACH preamble transmitted by the first MTC device 104a and the second PRACH preamble transmitted by the second MTC device 104b, the base station 102 identifies the first PRACH preamble index and the second PRACH preamble index received from the first MTC device 104a and the second MTC device 104b respectively. Further, the base station 102 transmits a pair of Random Access Response (RAR) messages, each to the first MTC device 104a and the second MTC device 104b based on an identification. The RAR message indicates a repetition level associated with the repeated transmission by the first MTC device 104a and the second MTC device 104b. The first MTC device 104a receives the RAR message indicating a repetition level associated with the repeated transmission and the second MTC device 104b receives the RAR message indicating a repetition level associated with the repeated transmission.

The method of managing the PBCH in the wireless communication network 100 is as described herein.

In an embodiment, the base station 102 is configured to encode partial bits of the MIB in the second subframe. In an embodiment, the second subframe can be a non MBSFN configurable subframe.

In an embodiment, the second subframe can be a subframe 5.

In an embodiment, the partial bits of the MIB in the second subframe include a first partial bit and a second partial bit. In an example, the first partial bit includes first fourteen (14) information bits (X) and the second partial bits include 16 bits of legacy CRC. Thus, the first partial bits and the second partial bits are concatenated to form a total of 30 bits (14 bits+16 bits). Further, these 30 bits are convolution encoded to form 90 encoded bits, out of which 72 bits are taken (which includes 42 bits of X and last 30 bits of encoded CRC). Hence, the partial bits of the MIB are encoded in the second subframe.

Further, the base station 102 is configured to encode the MIB in the first subframe. In an embodiment, the first subframe is subframe 0. The MIB encoded in the first subframe includes the legacy MIB which includes 120 bits (which includes 42 bits of X, 30 bits of Y and 48 bits of Z). The base station 102 transmits one or more of the first subframe and the second subframe to the MTC devices 104a, 104b and 104c. In an embodiment, the base station 102 can be configured to transmit both the first subframe and the second subframe or either of the first subframe and the second subframe.

Consider that the MTC device 104a receives the first subframe and the second subframe. When the MTC device 104a receives the first subframe and the second subframe, the MTC device 104a decodes the partial bits in the second subframe and the MIB in the first subframe. In an embodiment, the MTC device 104a decodes the partial bits in the second subframe and the MIB in the first subframe by combining the first subframe and the second subframe. In an embodiment, the MTC device 104a decodes the partial bits in the second subframe by interchanging the position of the first partial bit and the second partial bit received in the first subframe.

In an embodiment, the MTC device 104a inverts sign of bits in system frame number (SFN) present in the MIB received in the next subframes. Further, the MTC device 104a combines the bits in the SFN after inverting sign of the bits. In an embodiment, MTC device inverts the sign of the bits after every four frames in the next subframes.

In an embodiment, the MTC device 104a decodes the first partial bits which correspond to the SFN and the MTC device 104a decodes the second partial bits which correspond to the CRC.

The FIG. 1 shows a limited overview of the wireless communication 100, it should be understood that the other embodiments are not limited thereto. The wireless communication network 100 can include many components other than the components shown in the FIG. 1. Although the FIG. 1 is described with the respect to communication between the base station 102 and the MTC device 104a, it should be noted that the embodiments are not limited to the MTC device 104a. The embodiments can be performed on the other MTC devices (i.e., MTC device 104b and MTC device 104c or the like).

Figure 2A:
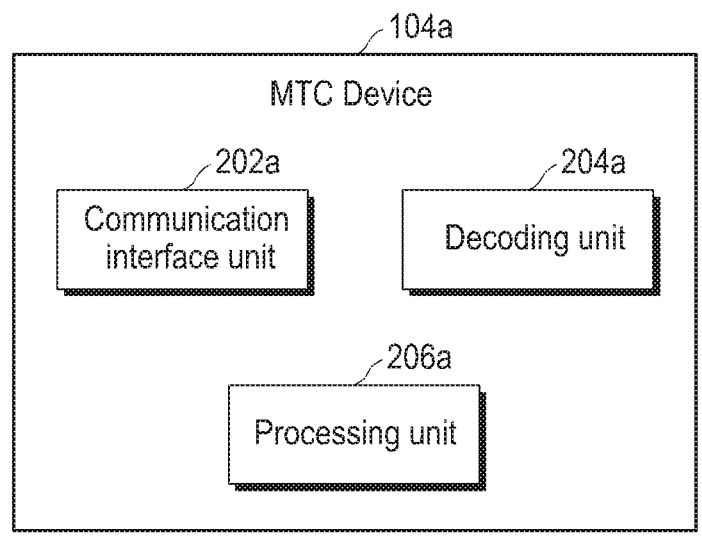
FIG. 2a illustrates various units of a machine-type-communication (MTC) device in the wireless communication network described in the FIG. 1, according to the embodiments as disclosed herein.

FIG. 2a illustrates various units of a MTC device 104a in the wireless communication network described in the FIG. 1, according to the embodiments as disclosed herein. As depicted in the FIG. 2a, the MTC device 104a includes a communication interface unit 202a, a decoding unit 204a and a processing unit 206a.

In an embodiment, the communication interface unit 202a is configured to communicate signaling messages to the base station 102. In an embodiment, the communication interface unit 202a is configured to perform one or more actions for facilitating the communication (which includes transmitting and receiving signaling messages) with the base station 102.

In an embodiment, the decoding unit 204a is configured to decode the transmission of data (i.e., the information bits) received in the first subframe and the second subframe from the base station 102.

In an embodiment, the processing unit 206a is configured to perform one or more actions (these actions are described in the later parts of the description) for managing the SIB in the wireless communication network 100. In an embodiment, the processing unit 206a is configured to perform one or more actions (these actions are described in the later parts of the description) for managing the PBCH in the wireless communication network 100.

Figure 2B:
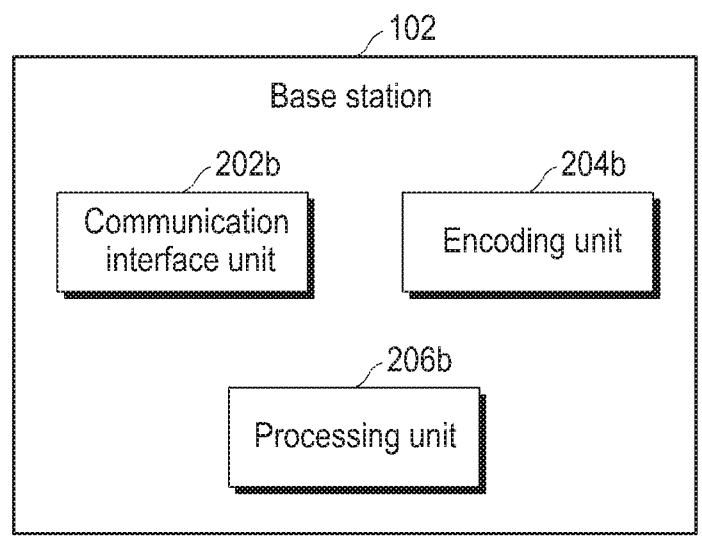
FIG. 2b illustrates various units of a base station in the wireless communication network described in the FIG. 1, according to the embodiments as disclosed herein.

FIG. 2b illustrates various units of a base station in the wireless communication network described in the FIG. 1, according to the embodiments as disclosed herein. As depicted in the FIG. 2b, the base station 102 includes a communication interface unit 202b, an encoding unit 204b and a processing unit 206b.

In an embodiment, the communication interface unit 202b is configured to communicate signaling messages to the MTC device 104a. In an embodiment, the communication interface unit 202b is configured to perform one or more actions for facilitating the communication (which includes transmitting and receiving signaling messages) with the MTC device 104a.

In an embodiment, the encoding unit 204b is configured to encode the MIB in the first subframe and the partial bits of the MIB in the second subframe.

In an embodiment, the processing unit 206b is configured to perform one or more actions (these actions are described in the later parts of the description) for managing the SIB in the wireless communication network 100. In an embodiment, the processing unit 206a is configured to perform one or more actions (these actions are described in the later parts of the description) for managing the PBCH in the wireless communication network 100.

Figure 3:
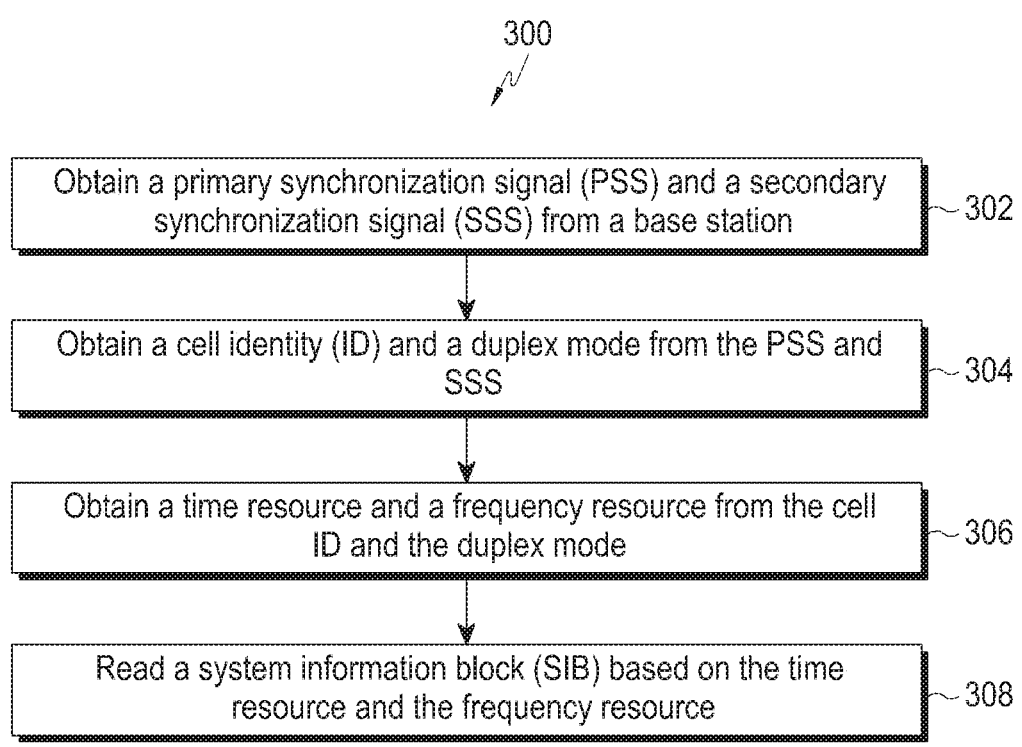
FIG. 3 is a flow chart illustrating a method for managing a system information block (SIB) in the wireless communication network, according to the embodiments as disclosed herein.

FIG. 3 is a flow chart illustrating a method 300 for managing a system information block (SIB) in the wireless communication network, according to the embodiments as disclosed herein. At step 302, the method 300 includes obtaining the PSS and the SSS from the base station 102. The method 300 allows the communication interface unit 202b to obtain the PSS and the SSS from the base station 102.

At step 304, the method 300 includes obtaining the cell ID and a duplex mode from the obtained PSS and the SSS. The method 300 allows the processing unit 206a to obtain the cell ID and a duplex mode from the obtained PSS and SSS.

At step 306, the method 300 includes obtaining the time resource and the frequency resource from the cell ID and the duplex mode. The method 300 allows the processing unit 206a to obtain the time resource and the frequency resource from the cell ID and the duplex mode.

At step 308, the method 300 includes reading the SIB based on the time resource and the frequency resource. The method 300 allows the processing unit 206a to read the SIB based on the time resource and the frequency resource.

The various actions, acts, blocks, steps, or the like in the method 300 may be performed in the order presented, in a different order or simultaneously. Further, in some embodiments, some of the actions, acts, blocks, steps, or the like may be omitted, added, modified, skipped, or the like without departing from the scope of the invention.

A method for managing a system information block (SIB) by a base station in a wireless communication network. The method includes setting a cell identity (ID) and a duplex mode in a primary synchronization signal (PSS) and a secondary synchronization signal (SSS), and transmitting, to at least one of a first MTC device and a second MTC, said PSS and said SSS, wherein said cell ID and said duplex mode is used for obtain a time resource and a frequency resource; and wherein a system information block (SIB) is read based on said time resource and said frequency resource.

A device for managing a system information block (SIB) by a base station in a wireless communication network is provided. The device includes a processing unit configured to: set a cell identity (ID) and a duplex mode in a primary synchronization signal (PSS) and a secondary synchronization signal (SSS); and a communication interface unit configured to: transmit, to at least one of a first MTC device and a second MTC, said PSS and said SSS, wherein said cell ID and said duplex mode is used for obtain a time resource and a frequency resource; and wherein a system information block (SIB) is read based on said time resource and said frequency resource.

Figure 4A:
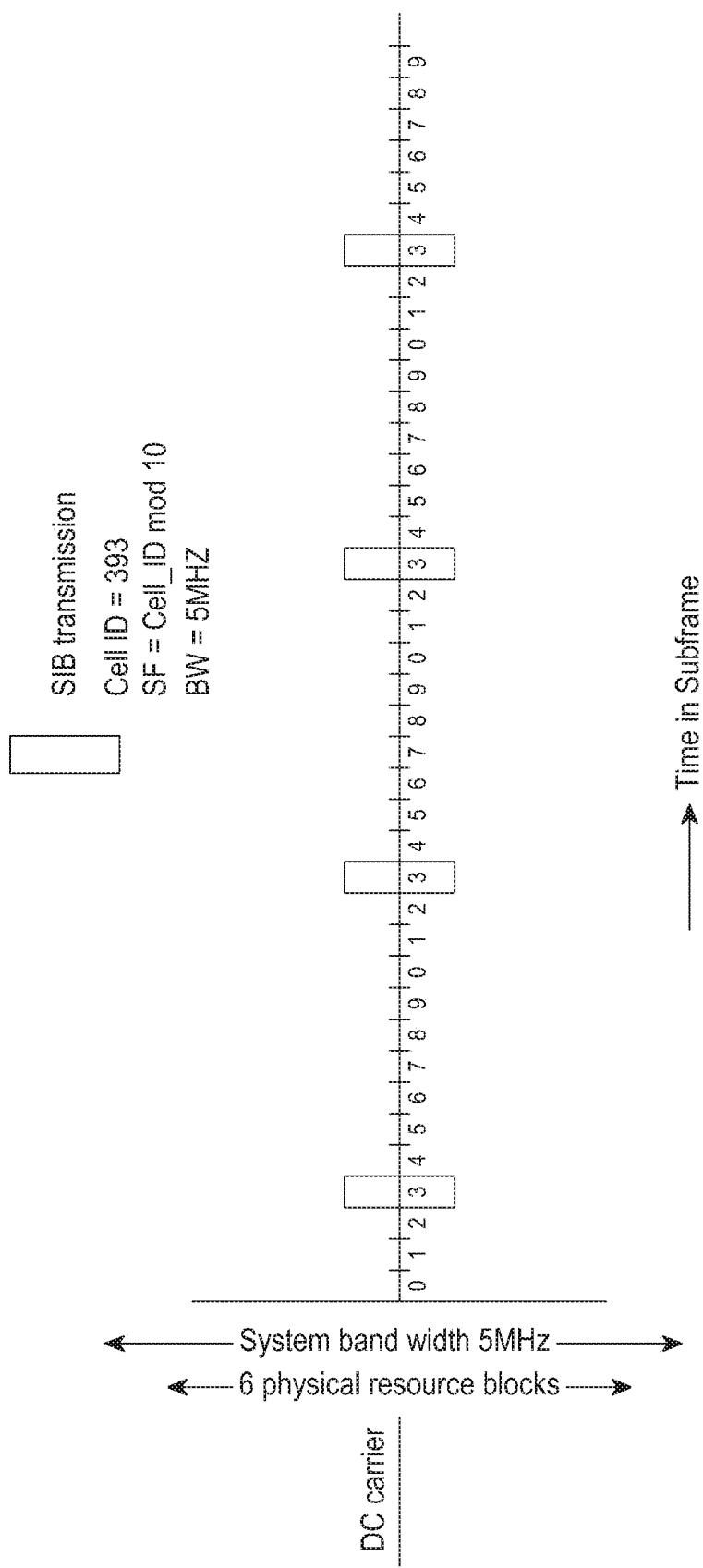
FIG. 4a is an example illustration in which the MTC device obtains a time resource and frequency resource for reading the SIB, according to the embodiments as disclosed herein.

FIG. 4a is an example illustration in which the MTC device obtains a time resource and frequency resource for reading the SIB, according to the embodiments as disclosed herein. The subframe in which the SIB is transmitted to the MTC device 104a is a function of cell ID and the MTC device 104a obtains the subframe based on the cell ID.

Initially, the MTC device 104a obtains PSS and SSS from the base station 102, the MTC device 104a obtains the cell ID and a duplex mode from the PSS and the SSS obtained from the base station 102. Further, the MTC device 104a obtains the time resource and the frequency resource from the cell ID and the duplex mode. After obtaining the time resource and the frequency resource, the MTC device 104a reads the SIB information.

In an embodiment, the MTC device 104a obtains the subframe in which the SIB is transmitted by computing the cell ID from the obtained PSS and SSS.

In the FIG. 4a, the base station 102 with cell ID 393 indicates to the MTC device 104a that the SIB is transmitted in the third subframe based on a function applied to the cell ID. In an example, the subframe can be obtained as function of cell ID mod 10. As shown in the FIG. 4a, the cell ID 393 mod 10 indicates the subframe 3 to the MTC device 104a. Hence, the MTC device 104a reads the SIB on the subframe 3.

FIG. 4b is another example illustration in which the MTC device obtains a time resource and frequency resource for reading the SIB, according to the embodiments as disclosed herein. The subframe in which the SIB is transmitted to the MTC device 104a is a function of cell ID and the MTC device 104a obtains the subframe based on the cell ID.

Initially, the MTC device 104a obtains PSS and SSS from the base station 102, the MTC device 104a obtains the cell ID and a duplex mode from the PSS and the SSS obtained from the base station 102. Further, the MTC device 104a obtains the time resource and the frequency resource from the cell ID and the duplex mode. After obtaining the time resource and the frequency resource, the MTC device 104a reads the SIB information.

In the FIG. 4b, the base station 102 with cell ID 393 indicates to the MTC device 104a that the SIB is transmitted in the third subframe. The MTC device 104a obtains the subframe based on the cell ID. In an example, the subframe can be obtained as function of cell ID mod 20. As shown in the FIG. 4b, the cell ID 393 mod 20 indicates the subframe 3 to the MTC device 104a. Hence, the MTC device 104a reads the SIB on the subframe 3 on every 'even' frame. From the FIG. 4b, it should be noted that the SIB is transmitted in the subframe 3 on every even frame.

For systems with low bandwidths, transmission of MTC_SIB in every frame can have high spectrum overhead. Hence, transmission period can be more than a frame. Since there is no means of signaling the periodicity information, the periodicity must be fixed for enabling the MTC device 104a to combine copies of relevant transmission. Further, for cases with periodicity more than a frame, MTC_SIB copies from successive frames cannot be combined. For example if MTC_SIB is transmitted in every 'even' frame as shown in the FIG. 4b, the MTC device 104a decodes the SIB by maintaining two copies of possible SIB transmissions and combining copies corresponding to even and odd frames separately in every frame, until SIB contents are successfully decoded.

When the SIB transmission periodicity increases, it also increases the memory and computation overhead on the MTC device 104a, as SIB periodicity of 'M' implies that that the MTC device 104a has to maintain 'M' possible copies of SIB transmission in addition to attempting to decode in every frame until SIB is successfully decoded. It should be noted that the time required to decode the SIB will increase with periodicity, hence more resources are required for decoding.

As the MTC device 104a does not have the base station 102 port information, the MTC device 104a should assume a four port transmission by the base station 102. Hence, the SIB transmission scheme by base station 102 will be similar to legacy MIB transmission where Resource Element (RE's) corresponding to all four cell specific reference signals in the SIB transmissions PRBs will not be used for SIB transmissions even when the base station is not using the port. In an embodiment, the port information can be conveyed through the SIB by scrambling the CRC with a port mask.

The MTC_SIB transmission parameters are as defined below.

MTC_SIB periodicity: $N_p$ frames
Size of MTC_SIB in bits: $N_s$
Number of REs available for transmission: $N_r$
Size of MTC_SIB post encoding: $N_e=3*N_s$
Modulation scheme: 4 QAM
Number of symbols after modulation mapping:

$$\frac{N_e}{2} = \frac{3*N_s}{2}$$

Number of repetitions $$N_{rep} = \left\lfloor N_r / \left(\frac{3*N_s}{2}\right) \right\rfloor$$

Code rate $$N_{CR} = \frac{N_s}{2*N_r}$$

While the value of $N_s$ depends on the contents to be transmitted, parameter $N_r$ should be chosen depending on required code rate $N_{CR}$, number of repetitions $N_{rep}$ required and the spectral overhead that can be tolerated within a frame. The effective overhead and decoding at the MTC device 104a depends on SIB periodicity $N_p$.

Consider an example where SIB is transmitted over center 6 physical resource blocks (PRBs). Assuming four port transmission, number of REs $N_r$=432 and the size of SIB $N_s$=143 bits. Hence, an effective code rate of $N_{CR}$=1/6 and number of repetitions $N_{rep}$=2 per transmission.

Figure 4C:
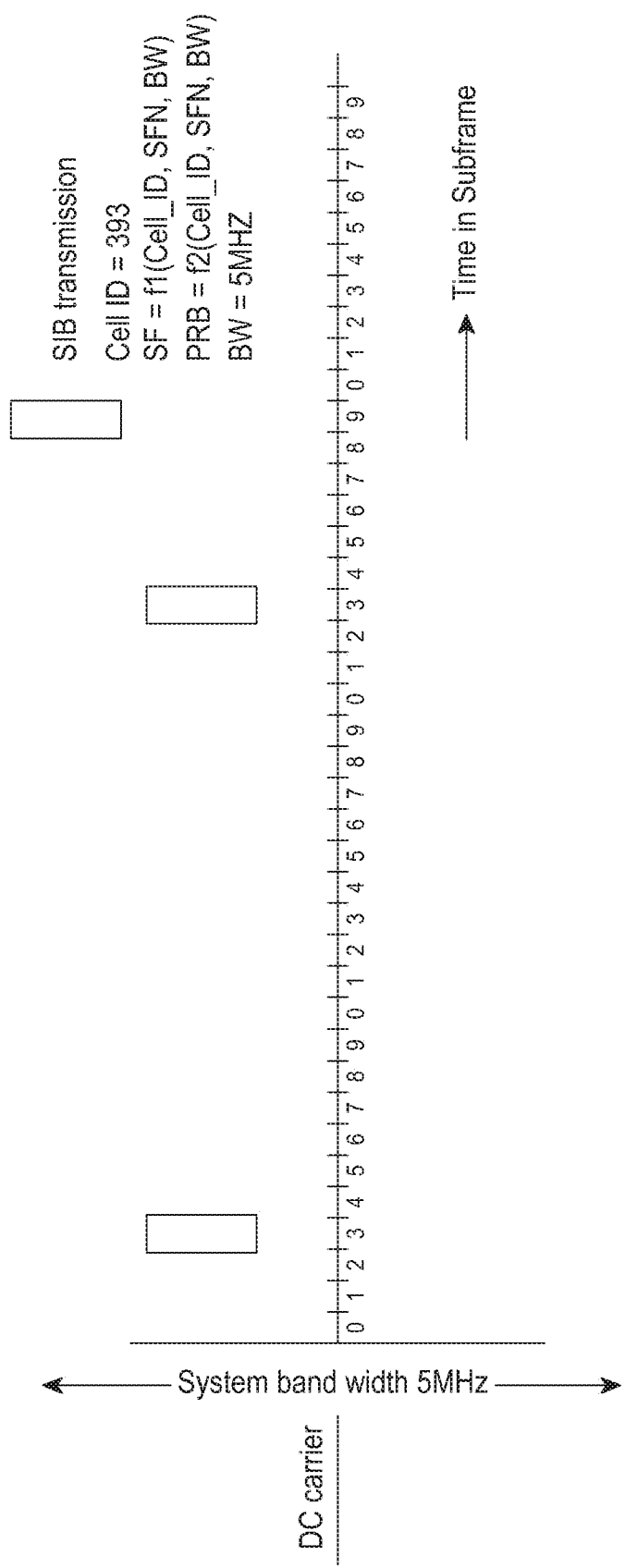
FIG. 4c is another example illustration in which the MTC device obtains a time resource and frequency resource for reading the SIB after reading a MIB, according to the embodiments as disclosed herein.

FIG. 4c illustrates another example illustration in which the MTC device 104a obtains a time resource and frequency resource for reading the SIB after reading a MIB, according to the embodiments as disclosed herein.

Initially, the MTC device 104a obtains the PSS and the SSS from the base station 102, the MTC device 104a obtains the cell ID and the duplex mode from the PSS and the SSS obtained from the base station 102. Further, the MTC device 104a receives bandwidth information and SFN from the base station 102 in the MIB. The MTC device 104a obtains time resource and the frequency resource from the cell ID, the duplex mode, the bandwidth information and the SFN. After obtaining the time resource and the frequency resource, the MTC device 104a reads the SIB information.

In the FIG. 4c, the MTC device 104a obtains the time resource and the frequency resource after reading the MIB which includes the bandwidth information and SFN. The MTC device 104a determines the subframe and Resource Block (RB) location in which the SIB is transmitted by computing the subframe and RB location based on the cell ID, the bandwidth information and the SFN.

In an embodiment, the MTC_SIB is transmitted at a fixed location within the bandwidth.

In an embodiment, the MTC_SIB is transmitted anywhere in the system BW, with the location indicated by a function of cell ID, duplex mode and SIB indicator bits inserted in PBCH.

Figure 5A:
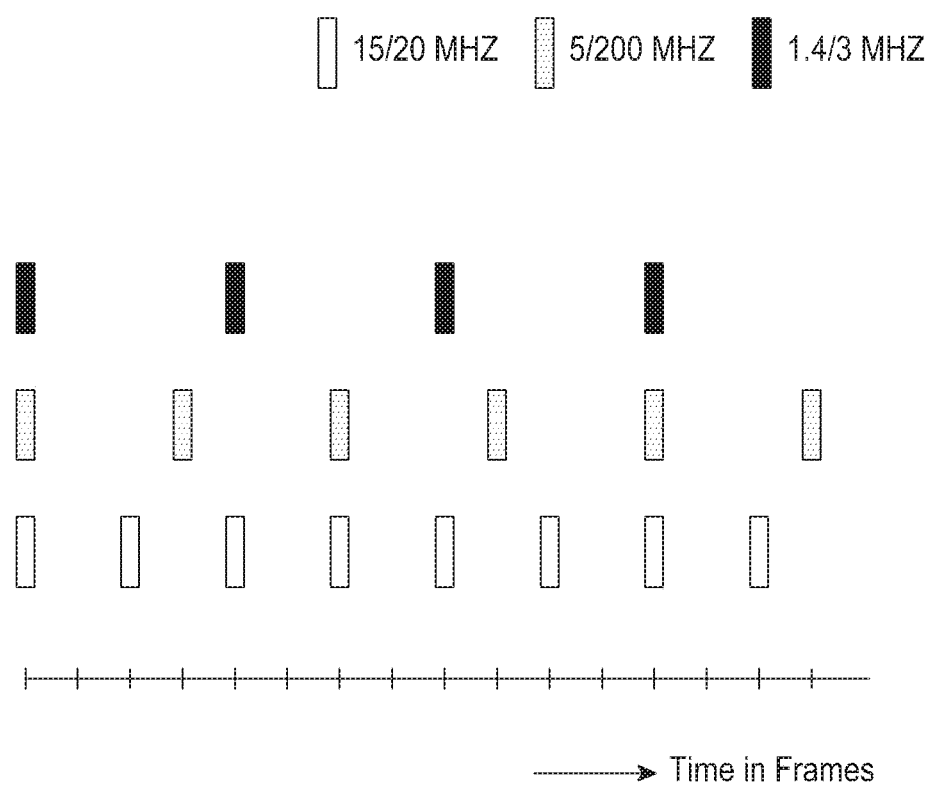
FIG. 5a is an example illustration of mapping SIB transmission periodicity and bandwidth, according to the embodiments as disclosed herein.

FIG. 5a is an example illustration of mapping SIB transmission periodicity and bandwidth, according to the embodiments as disclosed herein.

The transmissions can be made static or dynamic. The static scheme is simple to implement as it requires no explicit signaling as discussed before. Hence, the UE can search for SIB transmissions in predefined frame boundaries and search for subframes and physical resource blocks (PRBs) as calculated from available system information. Higher bandwidth systems can accommodate higher number of retransmissions for better SIB coverage in the cell. To maintain a relatively constant overhead in SIB transmission, higher bandwidth can have more number of transmissions.

For the dynamic case, information signaling can be achieved using the reserved bits in MIB. For example, off the reserved 10 bits available in MIB, if two bits are used as indices, UE can maintain a table with up to 4 entries from which it can obtain information on MTC_SIB time and frequency resources and transmission periodicity. Unlike in the case of SIB decoding without MIB, variation in memory and computational resources required by UE will be less effected in this scheme, as UE already has the information on MTC_SIB whereabouts, either obtained from system information or through explicit signaling.

TABLE 1

| | | Number of repetitions N_rep | | | |
|---|---|---|---|---|---|
| Index | Periodicity P | BW1.4\|3\|5 Mhz | BW10\|15\|20 Mhz | BW 1.4\|3 | prbOffset 0 |
| 00 | NA | NA | NA | 5 | 6 |
| 01 | 1 | 1 | 2 | 10 | 12 |
| 10 | 2 | 2 | 4 | 15 | 18 |
| 11 | 4 | 2 | 6 | 20 | 24 |

The table 1 shows a sample SIB transmission scheme where the base station 102 transmits SIB is satisfying the condition (SFN mod P=0) in predefined subframes. The UE will first read the MIB and determine the table from MIB bits 15 and 16 (currently reserved) to determine periodicity P and N rep. The table 1 also provides the information on PRB location for transmission mapped as a function of system bandwidth. Further, the number of copies of the SIB sent, N rep, is also determined using the 2 bits. It should be noted that the '00' implies that base station 102 provides no support for MTC devices hence may belong to release 12 or lower.

Since the base station 102 port information is already available at the UE, MTC_SIB transmission can be performed in a typical PDSCH method, but without the need of EPDCCH. In case of using EPDCCH to signal SIB control information, common search spaces, similar to PDCCH, will have to be defined to enable the UE to locate transmissions.

For MTC devices in coverage extended mode the SIB change periodicity is expected to be quite large compared to SIB in legacy system. Further, since the UE's already have the SFN information, this will also enable them to delay the beginning of SIB decoding in order to avoid change of SIB contents amidst decoding. For example, if SIB change is allowed only frames which meet the condition SFN mod 100=0, a UE seeing an SFN=97 may decide to wait for 30 ms before starting to decode SIB to avoid collecting transmissions with possible different contents.

Further, frequency hopping can be used to exploit frequency diversity for this scheme. Although this will increase the switching overhead at the UE, an optimal pattern for hopping can be chosen to utilize the diversity gain keeping the overhead at the UE to a minimum.

Figure 5B:
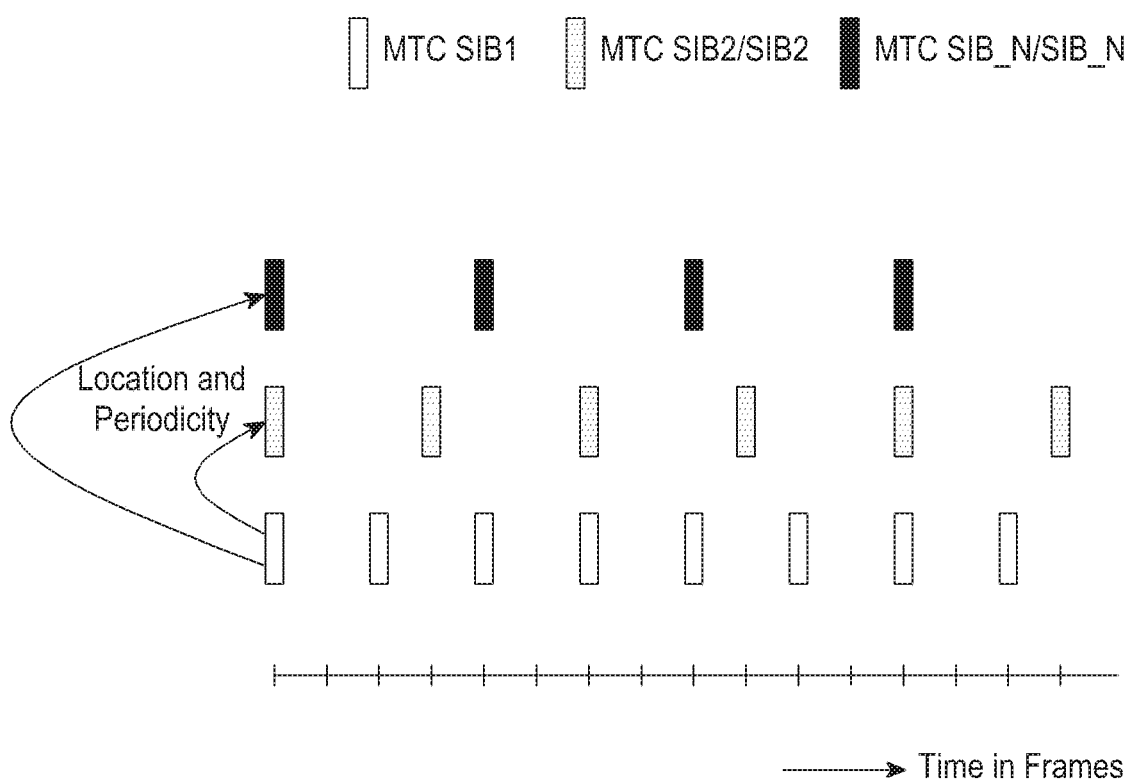
FIG. 5b is an example of obtaining other MTC_SIB information from MTC_SIB1, according to the embodiments as disclosed herein.

FIG. 5b is an example of obtaining other MTC_SIB information from MTC_SIB1, according to the embodiments as disclosed herein.

In an embodiment, the MTC_SIB can include other MTC_SIB or normal SIB, resource locations (time and frequency resources) along with periodicities, to minimize the need to send the control information indicating the SIB transmission.

This information in MTC_SIB will ease the process of acquiring system information (SI) for MTC device 104a with or without coverage enhancement. Further, the legacy UEs can use the same information to acquire the basic system information relevant for all the UEs in the system, even in coverage limited situation with legacy SIBs.

In an embodiment, indication of other MTC_SIBs or SIBs and their periodicities in MTC_SIB1 can be made dynamic with the SI modification window, reasonably long enough to achieve coverage enhancement and to reduce the burden of decoding the SI.

Figure 6:
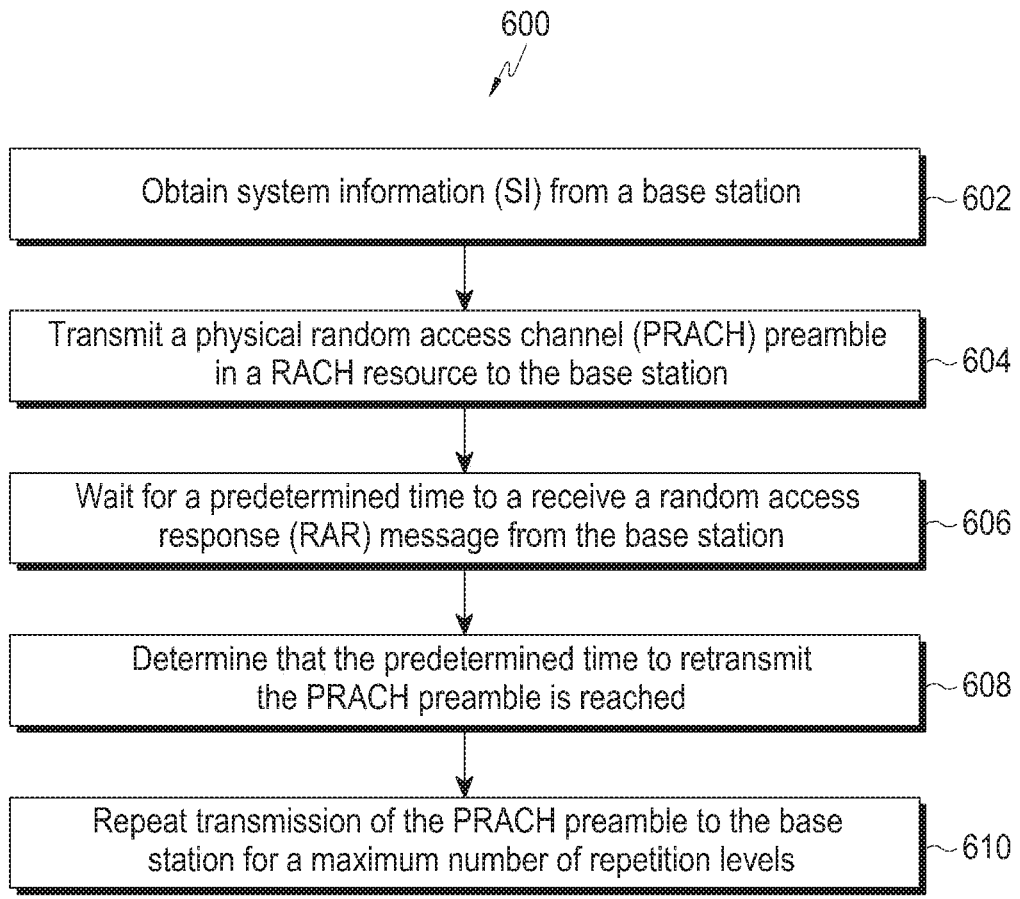
FIG. 6 is a flow chart illustrating another method for managing a system information block (SIB) in the wireless communication network, according to the embodiments as disclosed herein.

FIG. 6 is a flow chart illustrating another method 600 for managing a system information block (SIB) by MTC device in the wireless communication network, according to the embodiments as disclosed herein.

At step 602, the method 600 includes obtaining the SI from the base station 102. The method 600 allows the communication interface unit 202a to obtain the SI from the base station 102.

At step 602, the method 600 includes transmitting a physical random access channel (PRACH) preamble in the RACH resource to the base station 102. The method 800 allows the communication interface unit 202b to transmit the PRACH preamble in the RACH resource to the base station 102.

At step 604, the method 600 includes waiting for the predetermined time for a RAR message from the base station 102. The method 600 allows the processing unit 206b to wait for the predetermined time for the RAR message from the base station 102.

At step 606, the method 600 includes determining that the predetermined time to retransmit the PRACH preamble is reached. The method allows the processing unit 202b to determine that the predetermined time to retransmit said PRACH preamble is reached.

At step 608, the method 600 includes repeating transmission of the PRACH preamble to the base station 102 for a maximum number of repetition levels. The method allows the communication interface unit 202b to repeat transmission of the PRACH preamble to the base station 102 for the maximum number of repetition levels. In an example, the maximum number of repetition levels is three.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
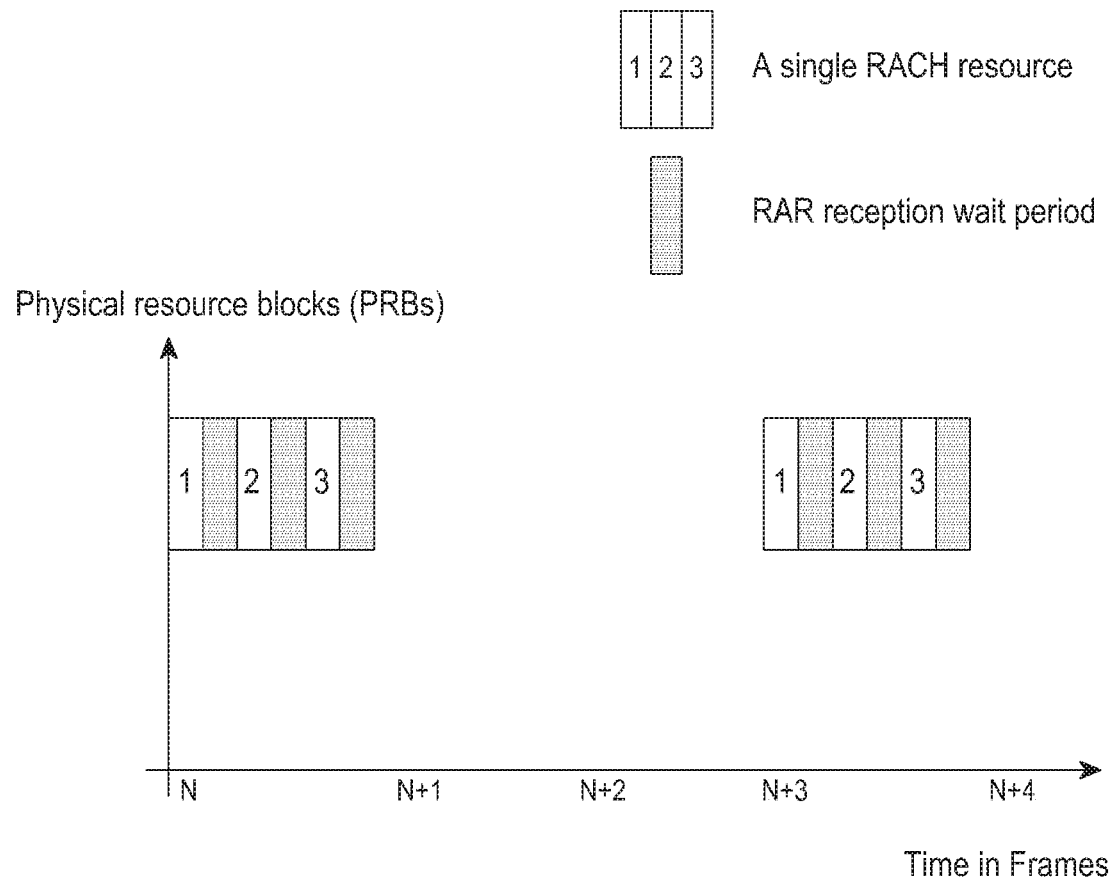
FIG. 7 is an example illustration in which the MTC device transmits physical random access channel (PRACH) preamble to the base station and repeats transmission of PRACH preamble for a maximum number of repetition levels, according to the embodiments as disclosed herein.

FIG. 7 is an example illustration in which the MTC device transmits physical random access channel (PRACH) preamble to the base station and repeats transmission of PRACH preamble for a maximum number of repetition levels, according to the embodiments as disclosed herein.

Initially, the MTC device 104a transmits the PRACH preamble in the RACH resource to the base station 102 in the RACH resource after obtaining the SI from the base station 102. After transmitting the PRACH preamble in the RACH resource to the base station 102, the MTC device 104a waits for the predetermined time to receive the RAR message from the base station 102. If the RAR message is not received from the base station 102 and if the predetermined time for retransmitting the PRACH preamble is reached, then the MTC device 104a repeats transmission of the PRACH preamble to the base station in the RACH for second time. Further, the MTC device 104 waits for the predetermined time to receive the RAR message from the base station 102. If the RAR message is not received from the base station 102 and if the predetermined time for retransmitting the PRACH preamble is reached, then the MTC device 104a repeats transmission of the PRACH preamble to the base station in the RACH for the third time and waits for the predetermined time to receive the RAR message from the base station 102 as shown in the FIG. 7. Thus, the MTC device 104a repeats the transmission of the PRACH preamble in the RACH resource to the base station 102 for the maximum number of attempts (i.e., three attempts as shown in the FIG. 7). It should be noted that the MTC device 104a transmits only once during each transmission of the PRACH preamble to the base station.

The MTC device 104a transmits the PRACH preamble to the base station after every three frames as shown the FIG. 7. From the FIG. 7, it should be noted that in the frame N, the MTC device transmits the PRACH preamble and in the frame N+3, the MTC device 104a transmits the PRACH preamble to the base station and repeats the transmission of PRACH preamble for the maximum number of attempts. Thus, in the above explained example, the MTC device 104a transmits the PRACH preamble to base station and waits for the RAR message for the predetermined time and repeats the transmission of the PRACH preamble after the predetermined time. Hence, the MTC device 104a repeats the transmission of PRACH preamble for the maximum number of attempts by stopping the transmission and waiting for the RAR message at the predetermined time.

Figure 8:
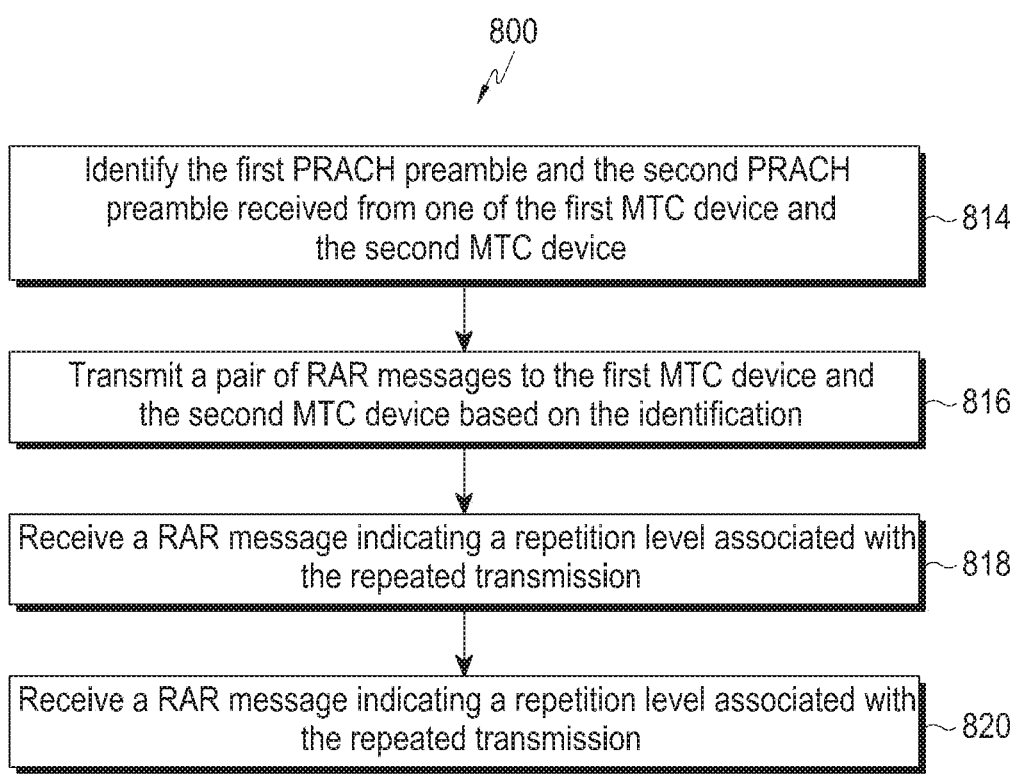
FIG. 8 is a flow chart illustrating another method of managing a system information block (SIB) in the wireless communication network, according to the embodiments as disclosed herein.

FIG. 8 is a flow chart illustrating another method 800 for a method for managing a system information block (SIB) by the base station in the wireless communication network, according to the embodiments as disclosed herein.

At step 814, the method 800 includes identifying the first PRACH preamble and the second PRACH preamble received from one of the first MTC device 104a and the second MTC device 104b. The method 800 allows the processing unit 206a to identify the first PRACH preamble received from one of the first MTC device 104a and the second MTC device 104b.

At step 816, the method 800 includes transmitting a pair of Random Access Response (RAR) messages to at least one of the first MTC device 104a and the second MTC device 104b based on the identification. The method 800 allows the communication interface unit 202a to transmit the pair of RAR messages to the first MTC device 104a and the second MTC device 104b based on the identification.

At step 818, the method 800 includes receiving a RAR message indicating a repetition level associated with the repeated transmission from the first MTC device 104a. The method 800 allows the communication interface unit 202a to receive the RAR message indicating a repetition level associated with the repeated transmission.

At step 820, the method 800 includes receiving a RAR message indicating a repetition level associated with the repeated transmission from the second MTC device 104b. The method 800 allows the communication interface unit 202a to receive the RAR message indicating a repetition level associated with the repeated transmission.

The various actions, acts, blocks, steps, or the like in the method 800 may be performed in the order presented, in a different order or simultaneously. Further, in some embodiments, some of the actions, acts, blocks, steps, or the like may be omitted, added, modified, skipped, or the like without departing from the scope of the invention.

FIGS. 9a-9d are example illustrations in which three MTC devices dynamically select a PRACH preamble and repeats transmission of selected PRACH preamble for a maximum number of repetition levels, according to the embodiments as disclosed herein.

In an embodiment, each MTC device (104a-104c) may utilize same or different set of MTC RACH resources depending on the repetition level it chooses and the PRACH configuration received from base station through a common MTC_SIB message. The base station 102 can configure the MTC devices to use same or different preamble set index and time frequency resources as regular UEs. In the FIG. 9a, the MTC device 104a transmits the PRACH preamble to the base station 102 and repeats the transmission of PRACH preamble for the maximum number of attempts. Thus, the MTC device 104a transmits the PRACH preamble to the base station 102 and waits for the RAR message for the predetermined time and repeats the transmission of the PRACH preamble after the predetermined time.

Consider a scenario where three MTC devices 104a, 104b and 104c are using the repetition levels 1, 2 and 3. Initially all the MTC devices 104a, 104b and 104c transmits the PRACH preamble by choosing the same preamble indexp0 (X=Y=Z=p0). In the FIGS. 9b-9d, the first MTC device 104a, the second MTC device 104b and the third MTC device 104c transmit the preamble indexp0 in the first transmission.

Figure 9A:
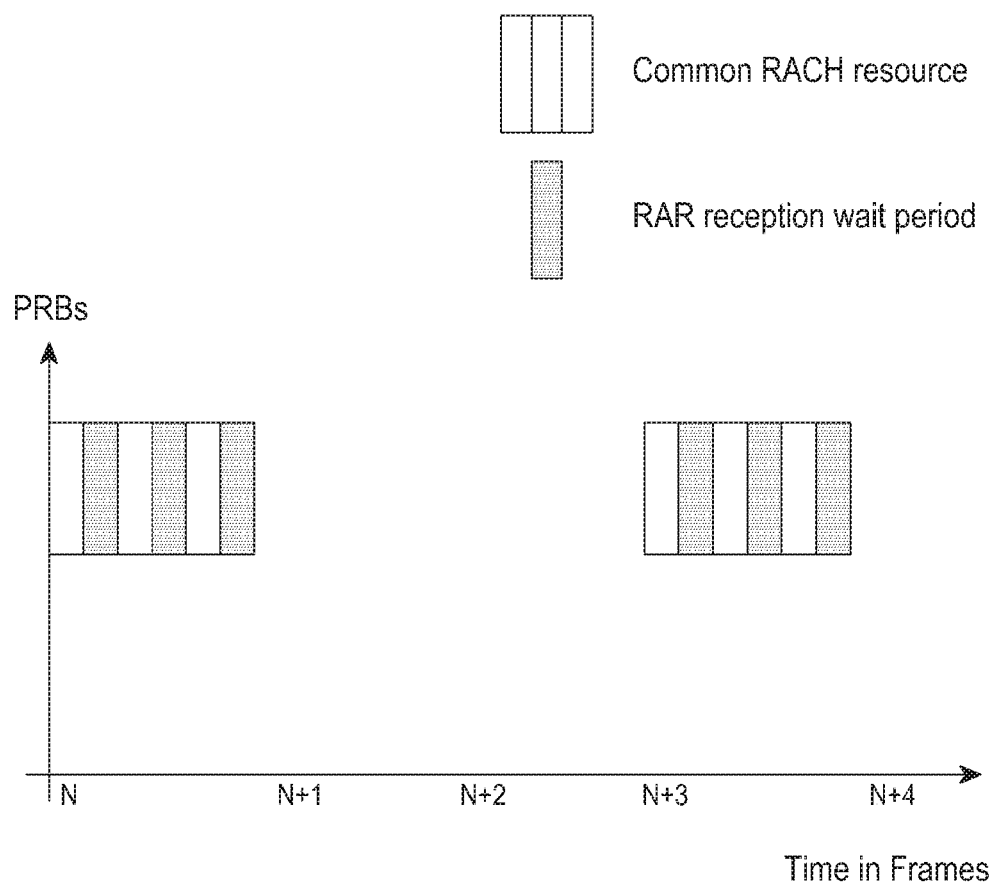
FIGS. 9a-9d are example illustrations in which three MTC devices dynamically select a PRACH preamble index and repeats transmission of selected PRACH preamble for a maximum number of repetition levels, according to the embodiments as disclosed herein.
Figure 9B:
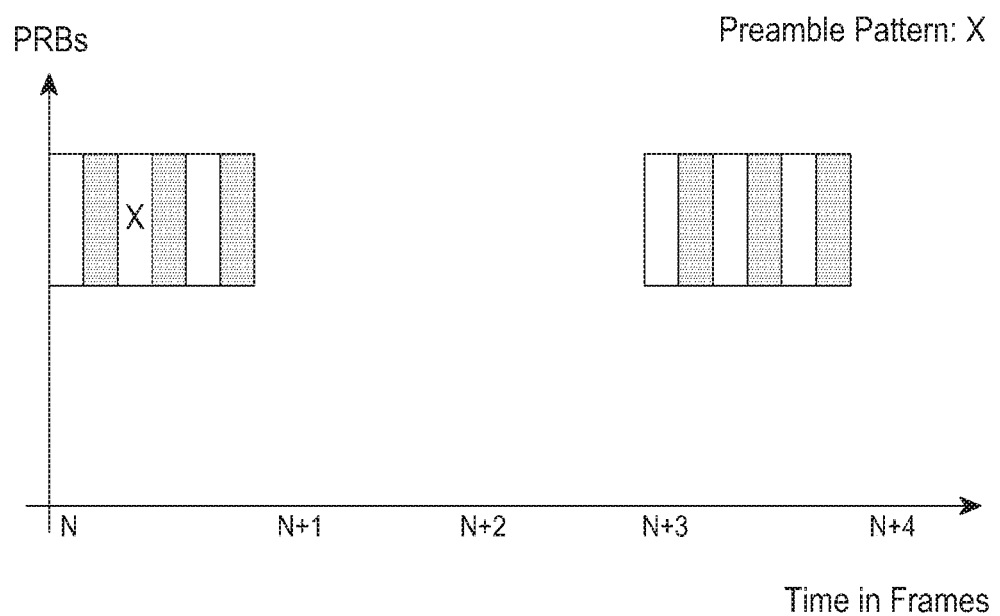
Figure 9C:
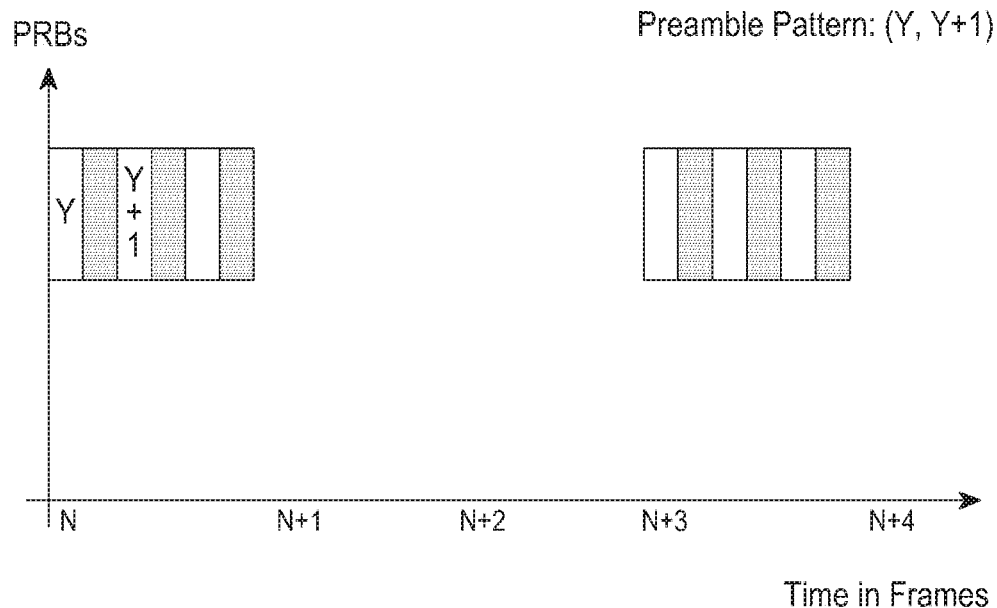

The MTC device 104b transmits the second preamble index as Y+1=(p0+2) in second repetition instead of p0 again, to avoid the contention with MTC device 103a second repetition as shown in the FIG. 9c. The MTC device 104c transmits the third preamble index Z+1=(p0+4), Z+2=(p0+7) in second repetition level and third repetition level respectively as shown in the FIG. 9c.

Figure 9D:
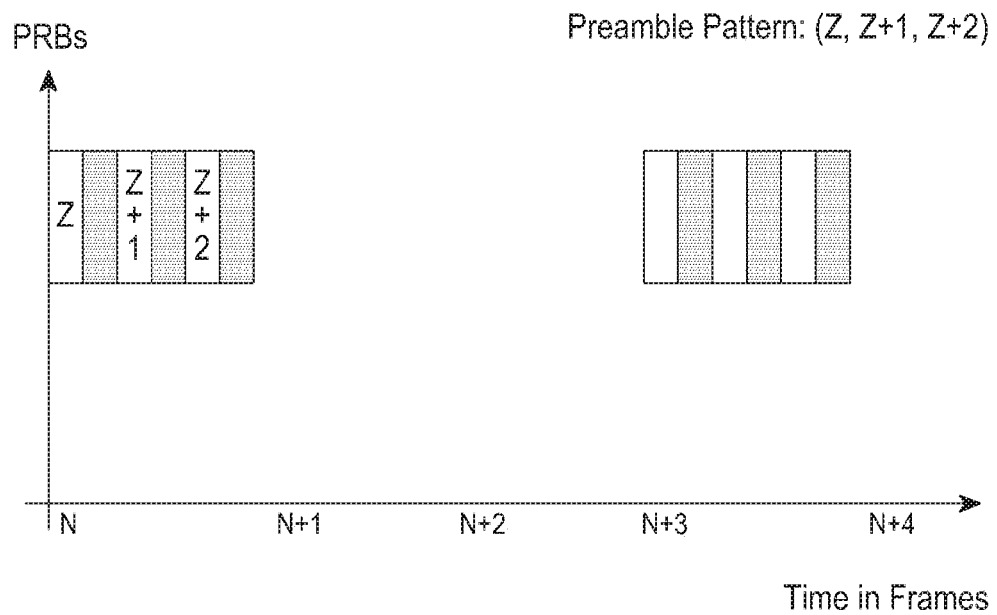

In the FIGS. 9b-9d, each MTC device dynamically selects a different preamble index in their second repetition level of transmitting the preamble to the base station 102 for avoiding the contention with other MTC devices.

The base station 102 performs the correlation on the received preamble to determine the PRACH preamble indices for second repetition level (i.e., level2 (p0, p0+2)) and third repetition (i.e., level3 (p0, p0+4, p0+7)). When the base station 102 identifies the PRACH preamble indices and the base station 102 obtains the repetition level used by the particular MTC device. These indices or patterns are fixed and known to both base station 102 and the MTC devices (104a-104c). Further, the base station 102 transmits the RAR message with a RA_RNTI which is function of time, frequency and preamble indices.

The RA_RNTI can be denoted as

RA_RNTI=$f(t\_id, f\_id, \text{index})$

In an example, the RA_RNTI transmitted by the base station can be

RA_RNTI=$1+t\_id+10*f\_id+(P_i-P_{i-1})$, where $P_i$ is the preamble index in last repetition and $P_{-1}=0$ In the FIG. 9b, the first MTC device 104a (with level1 transmission) receives the RAR message with RA_RNTI=$1+t\_id+10*f\_id+P_i$, ($P_{i-1}=0$ in this case since i=0). In this case, $P_i=0$, which indicates the MTC device 104a that the RAR is transmitted for the PRACH index$P_0$.

In the FIG. 9c, the second MTC device 104b (with level 2 transmission) receives the RAR message with RA_RNTI=$1+t\_id+10*f\_id+(P_i-P_{i-1})$, (In this case since i=1). In this case, RA_RNTI=$1+t\_id+10*f\_id+2$, ($P_1=p0+2$, $P_0=p0$), which indicates the second MTC device 104b that the RAR message is transmitted for the second PRACH preamble index in the second repetition level.

In the FIG. 9d, the third MTC device 104c (with level 2 transmission) receives the RA_RNTI=$1+t\_id+10*f\_id+(P_i-P_{i-1})$, (In this case since i=1, 2). In this case, the possible RA_RNTI values transmitted by the base station 102 are two, which are as mentioned below.

1. RA_RNTI=$1+t\_id+10*f\_id+3$, ($P_2=p0+7$, $P_1=p0+4$), when the MTC device 104c receives this RAR message, it indicates the MTC device 104c that a PRACH level 3 transmission is required.
2. RA_RNTI=$1+t\_id+10*f\_id+4$, ($P_1=p0+4$, $P_0=p0$), when the MTC device 104c receives this RAR message it indicates the MTC device 104c that PRACH level 2 is sufficient for transmission.

Although, in the above mentioned examples the RA_RNTI is function of difference between preamble indices in last two repetitions, the RA_RNTI can be made as a function of preamble indices as RA_RNTI=f ($t\_id$, $f\_id$, $P_0$, $P_1$ . . . ).

Figure 10:
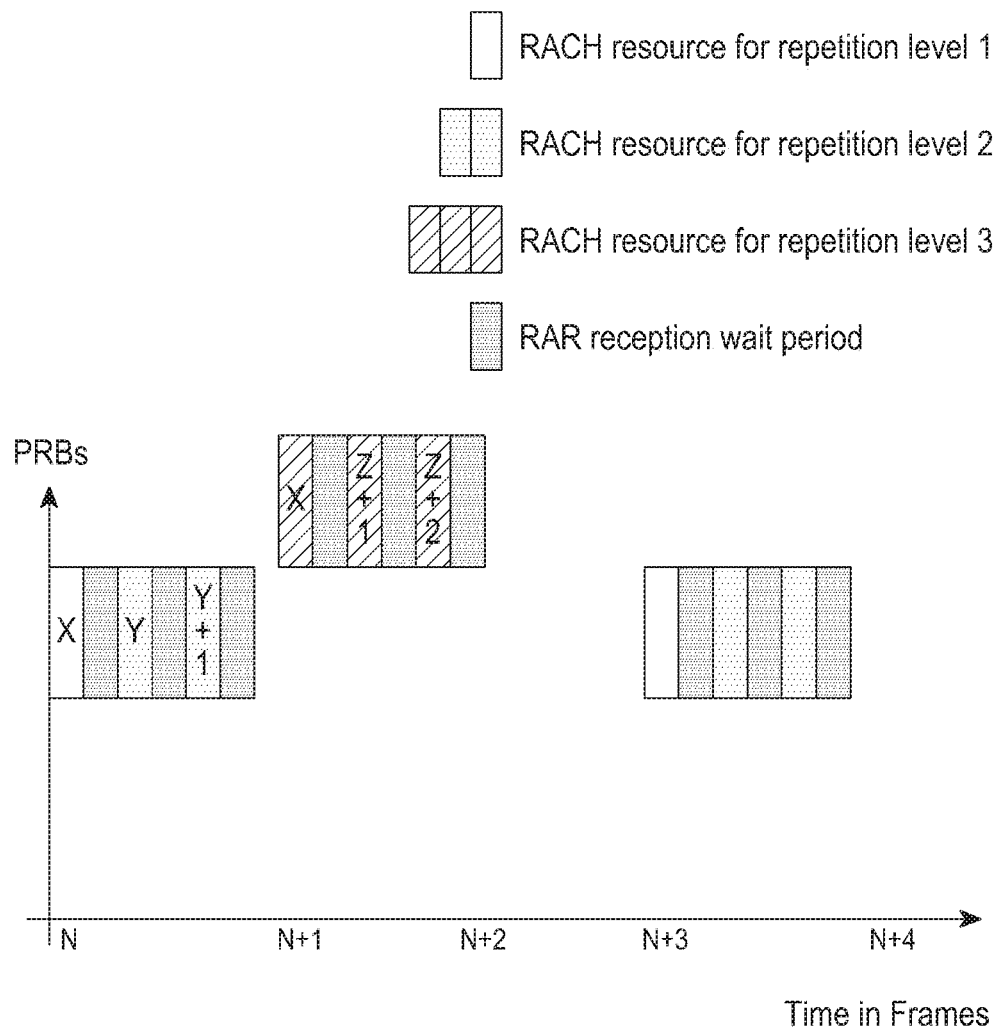
FIG. 10 is an example illustration in which different time and frequency resources with same PRACH preamble set allocated to the MTC devices, according to the embodiments as disclosed herein.

FIG. 10 is an example illustration in which different time and frequency resources with same PRACH preamble set allocated to the MTC devices, according to the embodiments as disclosed herein. The time and frequency resources are different for different repetition levels. As shown in the FIG. 10, same preamble set can be used for all the repletion levels without having collisions across the repetition levels. Within a repetition level, a preamble can be used to distinguish the end of the PRACH. Each of these PRACH indices acknowledged with a RAR message which includes a RA_RNTI, depended on the pattern used in MSG1 transmission.

In this case, the RA_RNTI can be denoted as

RA_RNTI=$f(t\_id, f\_id, P_0, P_1 \ldots)$

In an example, the RA_RNTI can be

RA_RNTI=$1+t\_id+10*f\_id+(P_i-P_{i-1})$, where $P_i$ is the preamble index in last repetition and $P_{-1}=0$ In the FIG. 10, the MTC device 104c with PRACH repetition level-3 uses different preamble indices in each of its repetitions at Z=p0, Z+1=p0+4, Z+2=p0+7. The MTC device 104c receives the RAR with RA_RNTI=$1+t\_id+10*f\_id+(P_i-P_{i-1})$, (In this case since i=1, 2).

In this case, the possible RA_RNTI values transmitted by the base station 102 are two, which are as mentioned below.

1. RA_RNTI=$1+t\_id+10*f\_id+3$, ($P_2=p0+7$, $P_1=p0+4$), when the MTC device 104c receives this RAR message, it indicates the MTC device 104c that a PRACH level 3 transmission is required.
2. RA_RNTI=$1+t\_id+10*f\_id+4$, ($P_1=p0+4$, $P_0=p0$), when the MTC device 104c receives this RAR message it indicates the MTC device 104c that PRACH level 2 is sufficient for transmission. Further, the MTC device 104c does not transmit the PRACH preamble in repetition level 3.

Figure 11A:
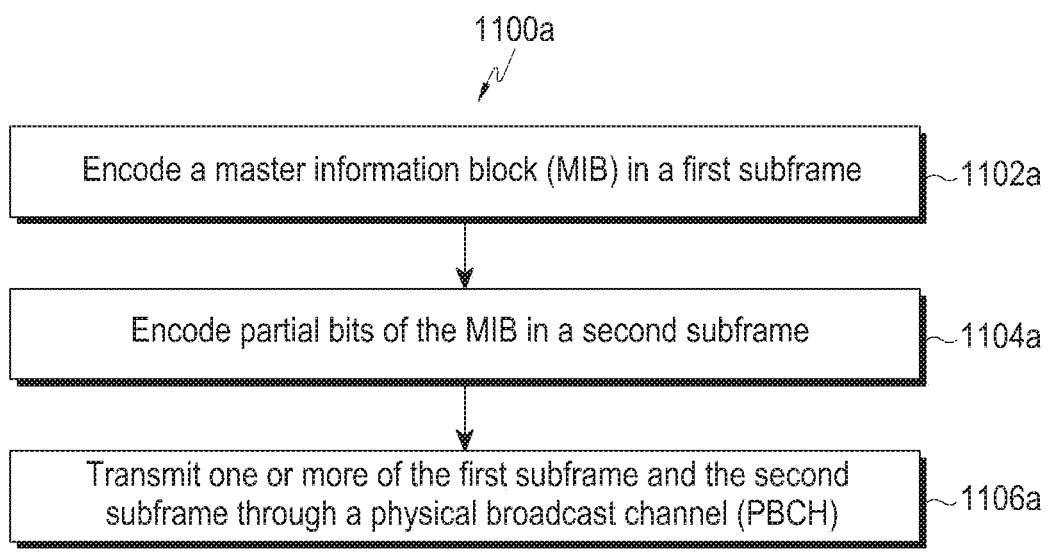
FIG. 11a is a flow chart illustrating a method for managing the PBCH by the base station in the wireless communication network, according to the embodiments as disclosed herein.

FIG. 11a is a flow chart illustrating a method 1100a for managing the PBCH by the base station in the wireless communication network, according to the embodiments as disclosed herein. At step 1102a, the method 1100a includes encoding a MIB in the first subframe. The method 1100a allows the encoding unit 204b to encode the MIB in the first subframe. The first subframe encoded with the MIB is shown in the FIG. 11a.

At step 1104a, the method 1100a includes encoding partial bits of the MIB in the second subframe. The method 300a allows the encoding unit 204b to encode the partial bits of the MIB in the second subframe. The partial bits of the MIB encoded in the second subframe are shown in the FIG. 12a.

At step 1106a, the method 1100a includes transmitting one or more of the first subframe and the second subframe on the PBCH. The method 1100a allows the communication interface unit 204b to transmit one or more of the first subframe and the second subframe on the PBCH.

The various actions, acts, blocks, steps, or the like in the method 1100a may be performed in the order presented, in a different order or simultaneously. Further, in some embodiments, some of the actions, acts, blocks, steps, or the like may be omitted, added, modified, skipped, or the like without departing from the scope of the invention.

Figure 11B:
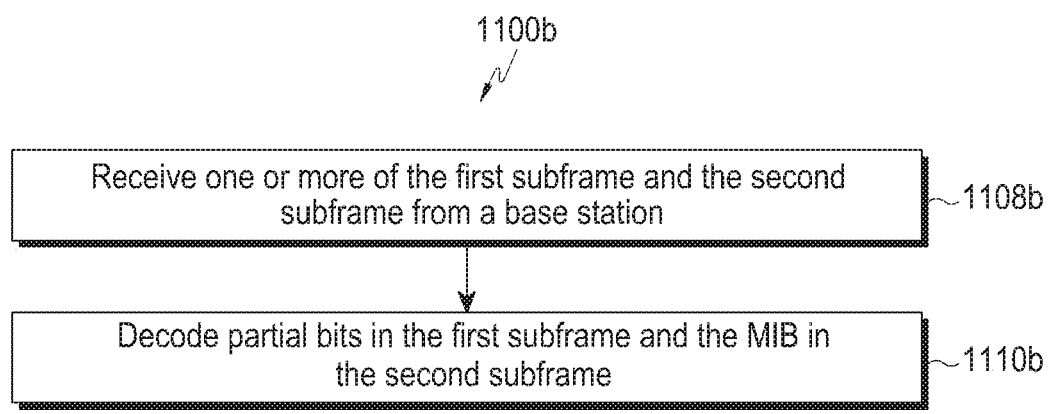
FIG. 11b is a flow chart illustrating a method for managing the PBCH by the MTC device in the wireless communication network, according to the embodiments as disclosed herein.

FIG. 11b is a flow chart illustrating a method 1100b for managing the PBCH by the MTC device in the wireless communication network, according to the embodiments as disclosed herein.

At step 1108b, the method 1100b includes receiving one or more of the first subframe and the second subframe from the base station 102. The method 1100b allows the communication interface unit 202a to receive one or more of the first subframe and the second subframe from the base station 102.

At step 1110b, the method 1100b includes decoding the first subframe and the second subframe from the base station 102. The method 1100b allows the decoding unit 204a to decode the first subframe and the second subframe received from the base station 102. The decoding of the first subframe and the second subframe is explained with examples in the FIGS. 12a-12d.

The various actions, acts, blocks, steps, or the like in the method 1100b may be performed in the order presented, in a different order or simultaneously. Further, in some embodiments, some of the actions, acts, blocks, steps, or the like may be omitted, added, modified, skipped, or the like without departing from the scope of the invention.

Figure 12A:
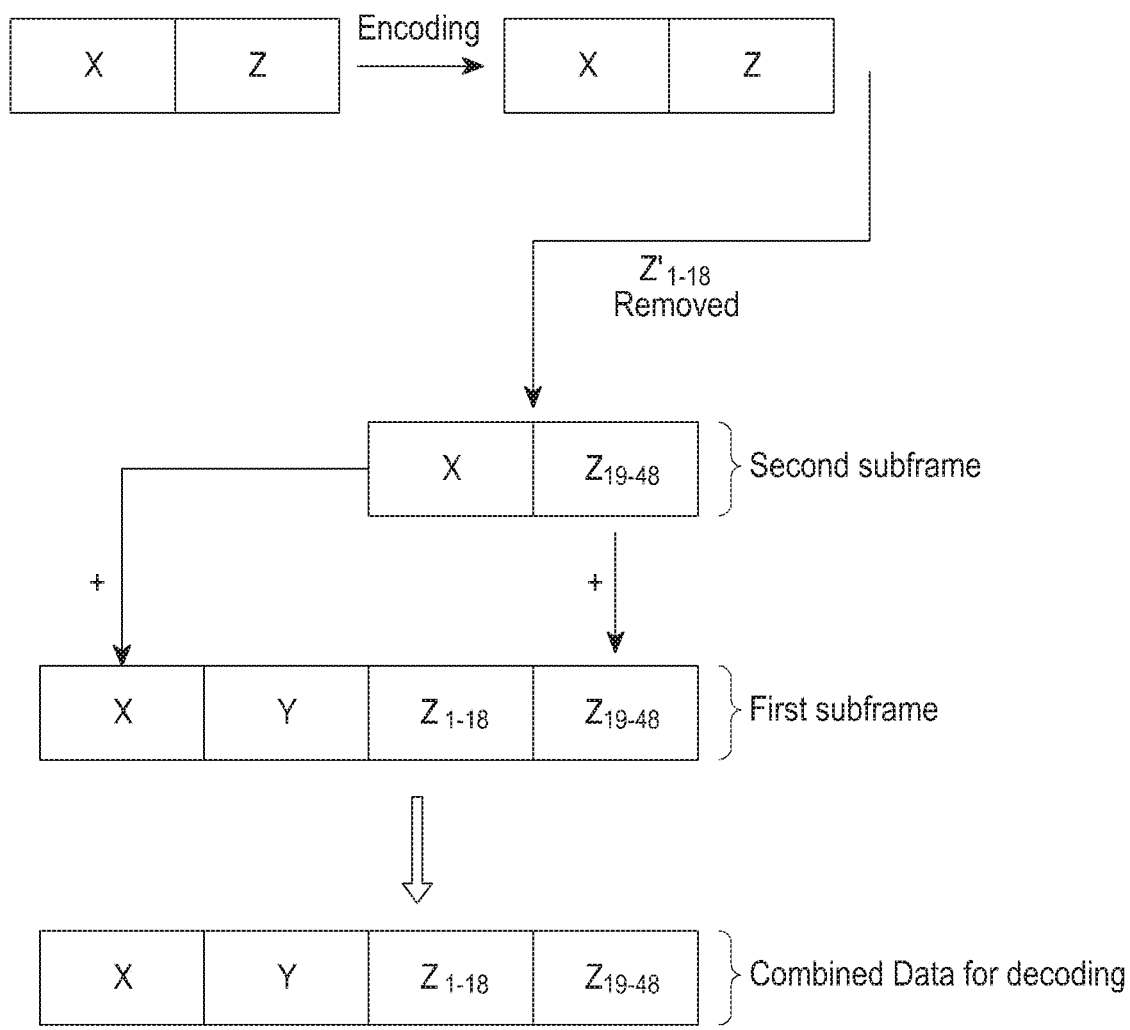
FIG. 12a illustrates encoding of a first subframe and a second subframe by the base station along with combining of the encoded bits, according to the embodiments as disclosed herein.

FIG. 12a illustrates encoding of a first subframe and a second subframe by the base station along with combining of the encoded bits, according to the embodiments as disclosed herein. As depicted in the FIG. 12a, a MTC MIB (which includes partial bits of the MIB) is included in the second subframe which is a non MBSFN configurable subframe (for example subframe 5). The MIB (legacy MIB)

is encoded in the first subframe (i.e., subframe 0). The partial bits of the MIB includes a first partial bits which contains first 14 information bits (x) concatenated with the second partial bits, 16 bits of the legacy CRC ($z_{7-16}$) which makes to a total of 30 bits. These 30 bits are convolution encoded to provide 90 encoded bits, out of which 72 bits (42 bits of X followed by $Z_{19-48}$) are taken. Considering the tail biting nature of encoding, the encoded X and $Z_{19-48}$ are same as that of legacy MIB as shown in FIG. 12a.

When the MTC device 104a receives the first subframe and the second subframe from the base station 102, the first MTC device 104a decodes the first subframe and the second subframe as shown in the FIG. 12a.

In an embodiment, log-likelihood ratios (LLRs) of received data in the second subframe (i.e., subframe 5) are combined with the corresponding LLRs of the legacy MIB data (in the first subframe) and tail-biting convolution decoding is performed over the resulting LLRs.

FIG. 12b illustrates decoding of partial bits in the second subframe by the MTC device, according to the embodiments as disclosed herein. The legacy MIB contains 24 bit (14 bit useful data and 10 unused bits) and after attaching 16 bit CRC, the total bits in the MTC MIB are 40.

Initially, the bits (40) are organized in the MIB as shown in the FIG. 12b. After encoding using tail-biting convolution code with rate 1/3, 120 encoded bits are transmitted in the first subframe (i.e., subframe 0) in every frame as shown in the FIG. 12b.

The encoded 120 bits (40 information bits) are transmitted in the first subframe (subframe 0) and if the partial bits of X (first partial bits) and Z (second partial bits) needs to be repeated then, only X and Z total of 90 encoded bits (30 information bits) in the second subframe (i.e., subframe 5) then combining these 90 received bits of subframe 5 and corresponding 90 bits of first subframe (i.e., subframe 0 ($X_{1-42}$ and $Z_{1-48}$)). In the bits of X and Z, the following points should be noted.

a. Starting state of Z is either all 0 or all 1 depending on y.
b. Starting state of X and last state of Z are same since tail-biting encoding is performed.

In an embodiment, the position of the first partial bits and the second partial bits received in the second subframe are interchanged for decoding the second subframe. During decoding, the position of partial bits are interchanged as [Z;X], i.e., first 48 bits of encoded data will be of Z and last 42 bits of encoded data will be of X in 90 bit data. When the position of the partial bits are interchanged, the decoding can be performed correctly because of interchanging of position from Z to X will be continuous, since last state of Z and first state of X are same and also it is known that the terminating state i.e., first state of Z (either all 0 or all 1).

In an embodiment, distributive property of CRC function can be used for decoding, which is $$F_{CRC}(x+y)=F_{CRC}(x)+F_{CRC}(y) \quad (1)$$

Since Z is $F_{CRC}([x; y])$, the equation (1) can be used to obtain $F_{CRC}(x)$ as the bits of y are known. Further, a CRC check is performed for received x.

Figure 12C:
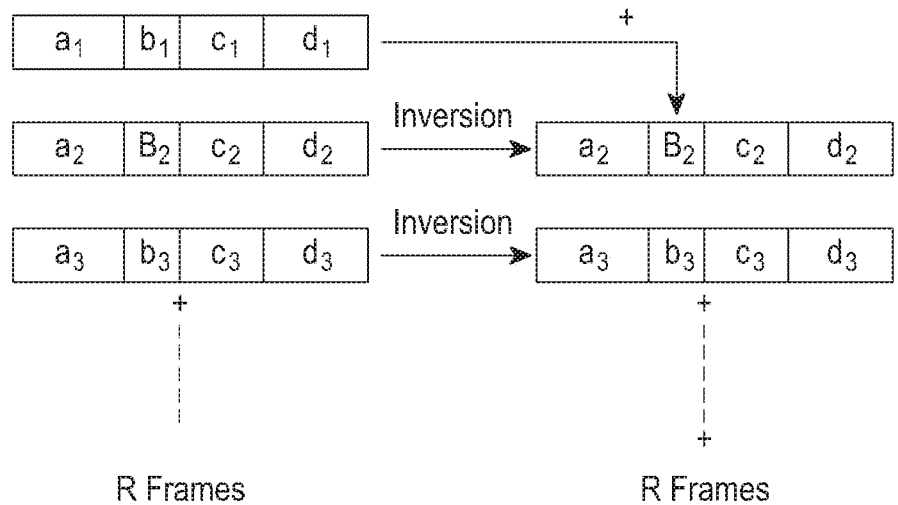
FIG. 12c illustrates inverting sign of bits in a system frame number (SFN) and a cyclic redundancy check (CRC) received in next subframes, according to the embodiments as disclosed herein.

FIG. 12c illustrates inverting sign of toggle bits in a system number (SFN) and a cyclic redundancy check (CRC) received in next subframes, according to the embodiments as disclosed herein. In legacy PBCH, the MIB data remains the same for four frames and eight (8) bits of SFN is incremented after every four frames. The MIB includes bandwidth (3 bits), PHICH duration (1 bit), PHICH Ng (2 bits), SFN (8 bits) and reserved bits (10 bits) plus a 16 bit CRC attached to these 24 bits in a total of 40 bits.

In an embodiment, the decoding unit 204a is configured to identify toggled soft bits in the SFN present in the MIB received in the first subframe. Further, the decoding unit 204a is configured to invert sign of toggle soft bits in the SFN. The toggled soft bits are combined during decoding the first subframe (i.e., subframe 0).

In an embodiment, these toggled soft decoded values for every frame are stored in a buffer for continuous number of frames (for example, R frames).

The PBCH acquisition by the MTC device 104a can be initiated from a frame number such that SFN mod 4=0,1,2,3. The first 8 bits of corresponding to the SFN has a range from 0 to 255. As the SFN changes after every 4 frames (as the 8 bit SFN increments by 1). Hence, change in the PBCH data is actually changing in the stored buffer. Thus, the inversion of changed bits wherever the data has changed accordingly and the data is combined as shown in the FIG. 12c. After combining, a decision is made from these combined soft toggled values to convert these soft toggled values to bits and finally, the CRC check is performed.

Some of the examples are provided below to explain the concept of soft bit inversion. The Total number of frames considered for combining are 16.

The base station 102 transmits the bits in the MIB (in the first subframe).

When the MTC device 104a receives the MIB, after decoding, the soft decoded values for each transmitted bit are obtained. The sign of the soft decoded value(x) represents the bit that is transmitted as shown below.

$$bit = \begin{cases} 0, x < 0 \\ 1, x > 0 \end{cases}$$

In the following table 2, the decoding is initiated from frame number 0. For first four frames, SFN contains 0000000(8-bit binary). After every four frames, the SFN is incremented by one.

TABLE 2

| Frame Number (N) | Bits in SFN at Transmitter (b content in FIG. 3) | Signs of soft bits corresponding to SFN bits at receiver | Soft bit Inversion-Signs of soft bits should be same as of first frame | Position of bits at which sign is inverted with respect to first frame data. [From LSB] |
|---|---|---|---|---|
| 0 | 00000000 (first frame) | [--------] | [--------] | |
| 1 | 00000000 | [--------] | [--------] | |
| 2 | 00000000 | [--------] | [--------] | |
| 3 | 00000000 | [--------] | [--------] | |
| 4 | 00000001 | [-------+] | [--------] | 1 |
| 5 | 00000001 | [-------+] | [--------] | 1 |
| 6 | 00000001 | [-------+] | [--------] | 1 |
| 7 | 00000001 | [-------+] | [--------] | 1 |
| 8 | 00000010 | [------+-] | [--------] | 2 |
| 9 | 00000010 | [------+-] | [--------] | 2 |
| 10 | 00000010 | [------+-] | [--------] | 2 |
| 11 | 00000010 | [------+-] | [--------] | 2 |
| 12 | 00000011 | [------++] | [--------] | 1, 2 |
| 13 | 00000011 | [------++] | [--------] | 1, 2 |
| 14 | 00000011 | [------++] | [--------] | 1, 2 |
| 15 | 00000011 | [------++] | [--------] | 1, 2 |

In another example, consider that the total number of frames considered for combining are 12.

In the following table 3, the decoding is initiated from Frame Number (N)=40. [40=0000101000 in 10-bit binary, therefore SFN=00001010, 8 MSB bits]

TABLE 3

| Frame Number (N) | Bits in SFN at Transmitter (b content) | Signs of soft bits corresponding to SFN bits at receiver | Soft bit Inversion-Signs of soft bits should be same as of first frame | Position of bits at which sign is inverted with respect to first frame data. [From LSB] |
|---|---|---|---|---|
| 1 | 00001010 (first frame) | [----+-+-] | [----+-+-] | |
| 2 | 00001010 | [----+-+-] | [----+-+-] | |
| 3 | 00001010 | [----+-+-] | [----+-+-] | |
| 4 | 00001010 | [----+-+-] | [----+-+-] | |
| 5 | 00001011 | [----+-++] | [----+-+-] | 1 |
| 6 | 00001011 | [----+-++] | [----+-+-] | 1 |
| 7 | 00001011 | [----+-++] | [----+-+-] | 1 |
| 8 | 00001011 | [----+-++] | [----+-+-] | 1 |
| 9 | 00001100 | [----++--] | [----+-+-] | 2, 3 |
| 10 | 00001100 | [----++--] | [----+-+-] | 2, 3 |
| 11 | 00001100 | [----++--] | [----+-+-] | 2, 3 |
| 12 | 00001100 | [----++--] | [----+-+-] | 2, 3 |

Figure 12D:
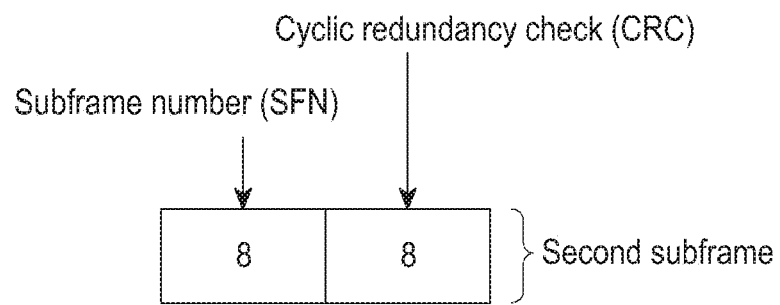
FIG. 12d illustrates partial bits of a MIB with a SFN and a cyclic redundancy check (CRC) in the first subframe, according to the embodiments as disclosed herein.

FIG. 12d illustrates partial bits of a MIB with a SFN and a cyclic redundancy check (CRC) in the second subframe, according to the embodiments as disclosed herein. In an embodiment, a MTC MIB is defined such that it contains first 8 bits of the SFN. An 8 bit CRC is attached to the MTC MIB, thus making it a total of 16 bits as shown in the FIG. 12d. This MIB is transmitted in any of the non MBSFN configurable subframes (for example, subframe 5) at the same locations in the grid as for the legacy PBCH. Hence, the PBCH is repeated 30 times per frame and 120 times per PBCH instance.

In an embodiment, the decoding unit 204a is configured to obtain soft decoded values instead of bits. These soft decoded values for every frame are stored in a buffer for continuous number of frames (for example, R frames).

The decoding unit 204b is configured to decode the first subframe to obtain the first 8 bits of SFN (N). The value of 'N' is known a priori and where N is known and the loop is executed for SFN mod 4=0,1,2,3.

The embodiments disclosed herein can be implemented through at least one software program running on at least one hardware device and performing network management functions to control the elements. The elements shown in the FIGS. 1 through 12d include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of managing a system information block (SIB), by a device, in a wireless communication network, the method comprising:
   receiving a primary synchronization signal (PSS) and a secondary synchronization signal (SSS), wherein the PSS and the SSS each include a cell identity (ID) of a base station and an indicator of a duplex mode setting;
   receiving a master information block (MIB) including bandwidth information and a system frame number (SFN);
   after receiving the MIB, obtaining a frequency resource and a time resource for the SIB from the cell ID of the base station and the indicator of the duplex mode setting included in the received PSS and SSS and the bandwidth information and the SFN included in the received MIB; and
   obtaining the SIB through the time resource and the frequency resource,
   wherein the frequency resource is obtained based on a function that applies modulo operation to the cell ID of the base station.

2. The method of claim 1, wherein the SIB comprises at least one of time related information or frequency related information of another SIB.

3. The method of claim 1, wherein the SIB is carried by a physical downlink shared channel (PDSCH).

4. The method of claim 3, wherein the PDSCH is transmitted periodically in a frame.

5. The method of claim 1, wherein the MIB is transmitted on a broadcast channel (BCH).

6. A device comprising:
   a transceiver; and
   at least one processor configured to:
      control to receive a primary synchronization signal (PSS) and a secondary synchronization signal (SSS), wherein the PSS and the SSS each include a cell identity (ID) of a base station and an indicator of a duplex mode setting,
      control to receive a master information block (MIB) including bandwidth information and a system frame number (SFN),
      after receiving the MIB, obtain a frequency resource and a time resource for a system information block (SIB) from the cell ID of the base station and the indicator of the duplex mode setting included in the received PSS and SSS and the bandwidth information and the SFN included in the received MIB, and
      obtain the SIB through the time resource and the frequency resource,
   wherein the frequency resource is obtained based on a function that applies modulo operation to the cell ID of the base station.

7. The device of claim 6, wherein the SIB comprises at least one of time related information or frequency related information of another SIB.

8. The device of claim 6, wherein the SIB is carried by a physical downlink shared channel (PDSCH).

9. The device of claim 8, wherein the PDSCH is transmitted periodically in a frame.

10. The device of claim 6, wherein the MIB is transmitted on a broadcast channel (BCH).

* * * * *